United States Patent
Foong et al.

(10) Patent No.: US 12,423,453 B2
(45) Date of Patent: Sep. 23, 2025

(54) METHODS AND APPARATUS TO CONTROL ACCESS TO USER DATA BASED ON USER-SPECIFIED ATTRIBUTES

(71) Applicant: Intel Corporation, Santa Clara, CA (US)

(72) Inventors: Annie Foong, Aloha, OR (US); Ramya Jayaram Masti, Hillsboro, OR (US); Georgia Sandoval, Irvine, CA (US)

(73) Assignee: INTEL CORPORATION, Santa Clara, CA (US)

( * ) Notice: Subject to any disclaimer, the term of this patent is extended or adjusted under 35 U.S.C. 154(b) by 761 days.

(21) Appl. No.: 17/561,891

(22) Filed: Dec. 24, 2021

(65) Prior Publication Data
US 2022/0121765 A1    Apr. 21, 2022

(51) Int. Cl.
| G06F 21/00 | (2013.01) |
| G06F 21/60 | (2013.01) |
| G06F 21/62 | (2013.01) |
| G06F 21/64 | (2013.01) |
| G06F 21/86 | (2013.01) |

(52) U.S. Cl.
CPC ........ G06F 21/6218 (2013.01); G06F 21/602 (2013.01); G06F 21/64 (2013.01); G06F 21/86 (2013.01); G06F 2221/2111 (2013.01); G06F 2221/2137 (2013.01); G06F 2221/2141 (2013.01)

(58) Field of Classification Search
CPC .... G06F 21/6218; G06F 21/602; G06F 21/64; G06F 21/86; G06F 2221/2111; G06F 2221/2137; G06F 2221/2141; G06F 21/87
See application file for complete search history.

(56) References Cited

U.S. PATENT DOCUMENTS

| 8,316,237 | B1 * | 11/2012 | Felsher | H04L 63/061 380/282 |
| 2002/0048369 | A1 * | 4/2002 | Ginter | H04L 9/3263 380/246 |
| 2003/0046589 | A1 * | 3/2003 | Gregg | H04L 63/0853 726/5 |
| 2003/0191719 | A1 * | 10/2003 | Ginter | H04L 9/40 375/E7.009 |
| 2004/0054630 | A1 * | 3/2004 | Ginter | H04N 7/162 375/E7.009 |
| 2004/0133793 | A1 * | 7/2004 | Ginter | H04N 21/4753 375/E7.009 |

(Continued)

Primary Examiner — Mahfuzur Rahman
(74) Attorney, Agent, or Firm — JAFFERY WATSON HAMILTON & DESANCTIS LLP

(57) ABSTRACT

Methods, apparatus, systems, and articles of manufacture for controlling access to user data are disclosed herein. One such apparatus to control access to user data includes memory, instructions, and at least one processor to execute the instructions to attempt to verify an identity bid associated with a request for access to user data to be processed. The identity bid includes a cryptographic signature based on a secret embedded in a data compute agent that generated the identity bid. The processor is also to determine whether agent attributes included in the identity bid satisfy user data attributes associated with the user data, and to permit the data compute agent to access the user data when the identity bid is verified, and when the agent attributes satisfy the user data attributes.

14 Claims, 18 Drawing Sheets

(56) References Cited

U.S. PATENT DOCUMENTS

| | | | |
|---|---|---|---|
| 2005/0177716 A1* | 8/2005 | Ginter | G06T 1/0021 |
| | | | 713/157 |
| 2013/0159021 A1* | 6/2013 | Felsher | G16H 10/60 |
| | | | 705/3 |
| 2014/0164776 A1* | 6/2014 | Hook | G06F 21/6218 |
| | | | 713/171 |
| 2015/0324571 A1* | 11/2015 | Hernoud | G06F 21/34 |
| | | | 726/5 |
| 2017/0141925 A1* | 5/2017 | Camenisch | H04L 63/0823 |
| 2018/0240107 A1* | 8/2018 | Andrade | G06Q 20/065 |
| 2020/0053072 A1* | 2/2020 | Glozman | H04W 12/08 |
| 2020/0259668 A1* | 8/2020 | Loreskar | G06F 21/44 |
| 2023/0173395 A1* | 6/2023 | Cella | G06Q 30/06 |
| | | | 463/25 |
| 2024/0070236 A1* | 2/2024 | Cella | G06Q 20/065 |

\* cited by examiner ns and/or the
METHODS AND APPARATUS TO CONTROL ACCESS TO USER DATA BASED ON USER-SPECIFIED ATTRIBUTES

FIELD OF THE DISCLOSURE

This disclosure relates, generally, to data access control and, more particularly, to methods and apparatus to control access to user data based on user-specified attributes.

BACKGROUND

Distributed services, including distributed microservices, can be used to process user-data supplied by a user device. Manipulations, algorithms, and other actions associated with the services are applied to the user data and results generated by the services are supplied back to the user device. As such, the distributed services effectively expand the capabilities of the user-device.

Figure 1:
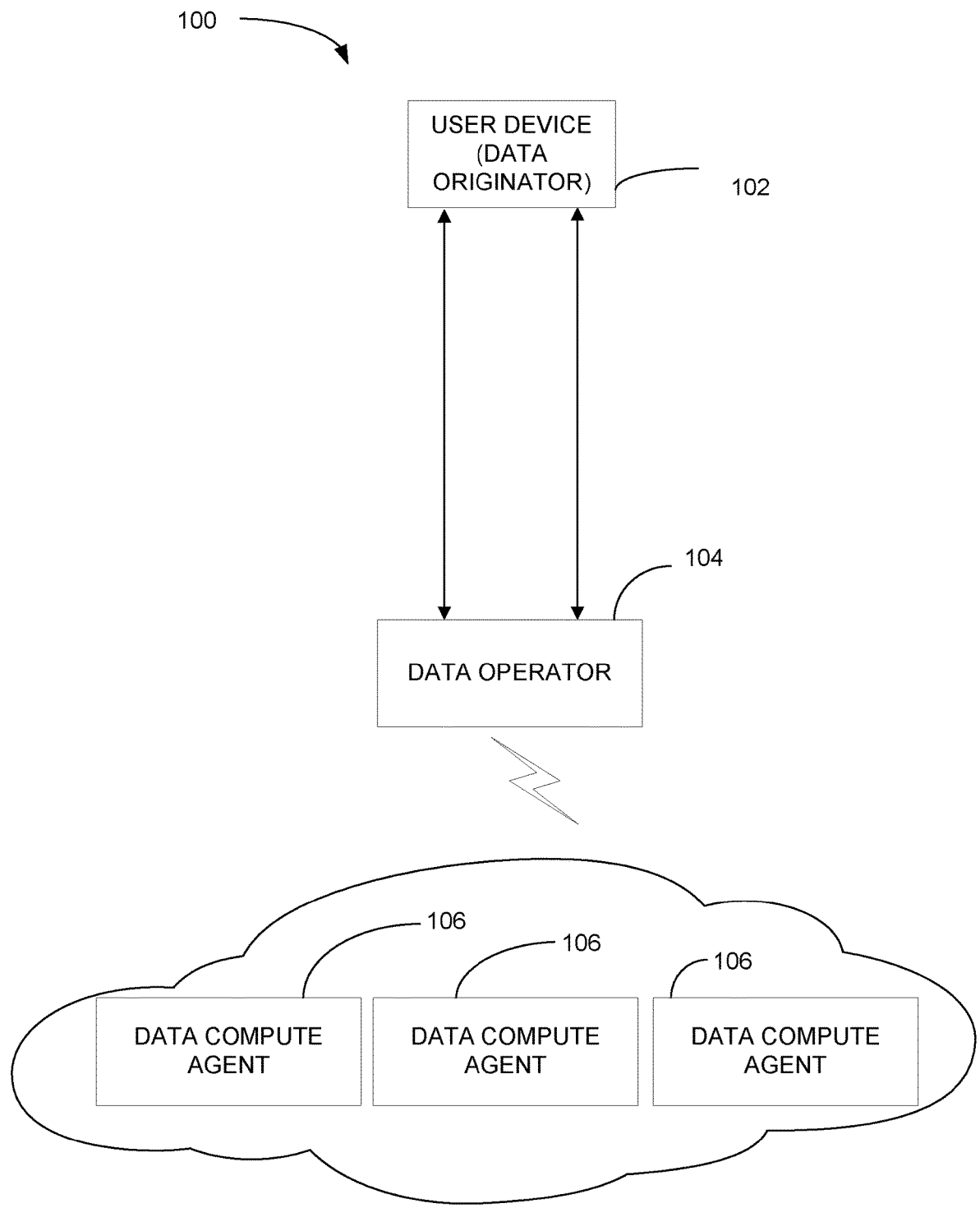
FIG. 1 is a block diagram of a system including a user device, a data operator and a set of data compute agents all of which securely exchange and/or operate on user data in compliance with a user data attribute-based data protection protocol in accordance with the teachings disclosed herein.

In general, the same reference numbers will be used throughout the drawing(s) and accompanying written description to refer to the same or like parts. The figures are not to scale Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather, additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DESCRIPTION

Distributed services extend/complement the processing capabilities of a user device. Such services are provided by processor circuitry/compute devices that are in communication with, but separate from, the user device. Thus, the distributed services are also referred to herein as "off-device" services. As user data supplied to an off-device service is no longer within direct control of the user, protections are needed to limit how, where, and/or when the user data is used as well as who is permitted to access the user data.

Currently, attribute-based encryption is used to provide such user-data protection. Attribute-based encryption involves user keys and ciphertexts that are both associated with attributes. Ciphertext generated using attribute-based encryption can only be decrypted when attributes of the user key match attributes of the ciphertext. Thus, to enable attribute-based encryption, user keys are distributed and revoked at appropriate times. Unfortunately, schemes by which user keys are distributed and revoked are typically complex and inefficient.

Methods, apparatus, systems, and articles of manufacture to control access to user data based on user-specified attributes are disclosed herein. Such disclosed methods, apparatus, systems and articles of manufacture implement a user data attribute-based data protection protocol to achieve controlled, context-specific access to user data. The disclosed user data attribute-based data protection protocol is both simpler and more efficiently implemented than attribute-based encryption techniques.

In some examples, the disclosed user data attribute-based data protection protocol specifies one or more attributes (selectable by the user) that must be met (satisfied) by another entity before that other entity is permitted to operate on, store, or transmit the user data. Similarly, the entities desirous of operating on, storing or transmitting the user data all agreed to comply with the measures/demands of the user data attribute-based data protection protocol. In some examples, the attributes specify a time period during which the data may be operated on, a geographic location at which the data may be operated on, a manner in which the data may be operated on (operations permitted or not permitted), and an entity (or entities) that are permitted to operate on the data.

In some examples, the user data attribute-based data protection protocol is used as a data permit by which one entity may permit a different entity access to and usage of data provided that the attributes of the user data attribute-based data protection protocol are met by the different party at the time that the accessing and processing of the data is performed. In some examples, the user data attribute-based data protection protocol is used as a data passport in that 1) a data-supplying entity can permit (or deny) a data-processing entity access to or usage of data, and 2) a data processing entity can accept or refuse to operate on data from a data-supplying entity. In this manner, the data supplying entity (e.g., the user device) can use the user data attribute-based data protection protocol to ensure the data processing entity (e.g., the party that operates on the data, also referred to herein as a data compute agent) is trustworthy before granting access to the user data. Likewise, the data processing entity can use the user data attribute-based data protection protocol to ensure that a user device (or any other device) that is supplying the data is trustworthy so that the data processing entity can be assured that the data is valid (e.g., not corrupt, virus free, not spoofed, etc.).

In some examples, a public/private key encryption method(s) is used to implement, in part, the user data attribute-based data protection protocol. Such encryption methods aid in limiting the actors that can participate in a data exchange/agreement to trustworthy entities (also referred to as trusted actors). In some examples, the user data attribute-based data protection protocol is implemented using 2 key pairs and includes operations by which data processing entities/data compute agents can be audited for trustworthiness (e.g., audited for processing performed in compliance with the user data attributes). In some examples, auditing of the entities is performed using audit messages and cryptographic challenges as described further herein. In some examples, the user data attribute-based data protection protocol includes auditing compliance by way of response bids as described further below. Additionally, in some examples, communication sessions are used to securely communicate user data and other information. Usage of communication sessions minimizes the number of protocol handshakes that would otherwise be required, as once a session is open the need to reverify the identity of a communicating party is eliminated.

In some examples, the user data attribute-based data protection protocol disclosed herein is enforced at the hardware level by the various entities involved in the data processing (e.g., the data-generating entities, the data processing entities, the data supplying entities, etc.). Thus, processing of the user data attribute-based data protection protocol is offloaded onto a silicon chip (also referred to as silicon/hardware componentry/circuitry) installed in compute devices of the entities exchanging and operating on the data. In some such examples, the silicon chips (silicon/hardware componentry/circuitry) are configured to be tamper proof and have tamper proof location generating circuitry and tamper proof time stamp generating circuitry. In some examples, silicon/hardware component/circuitry having such characteristics, include a secret code that is burnt into the silicon/hardware component/circuitry. A private cryptographic signature is generated based on the secret and the encrypted user data and/or encrypted user data attributes are signed with the crypto-signature. When the crypto-signature is verified by a recipient of the user data and/or the user data attributes, the recipient is assured that the user data and/or the user data attributes were transmitted by a trusted entity and were not tampered with during transmission.

In some examples, in addition to using cryptographic signatures so that a source of data can be verified and/or so that a data processing entity can be verified, auditing messages are used to monitor the behavior of entities that are operating on and/or exchanging the user data. Examples of ways to implement and use the user data attribute-based data protection protocol are provided below.

FIG. 1 is a block diagram of an example system 100 to control access to user data generated by an example user device 102 (also referred to herein as a data originator 102). In addition to the user device 102, the system 100 includes an example data operator 104 and various different data compute agents 106. The user device 102, data operator 104, and the data compute agents 106 securely exchange and/or operate on the user data (also referred to as "protected user data") in compliance with a user data attribute-based data protection protocol based on user-specified attributes in accordance with the teachings disclosed herein. In some examples, the data operator 104 asks the user to share the user data for the purpose of providing or accessing a service. In return for access to the data, the data operator 104 promises the user to protect the user data based on attributes to be specified by the user. In some examples, the attributes include a time frame, a geographical location, one or more operations that are permitted to be used when processing the user data, and/or one or more operations that are not permitted to be used when processing the user data, etc. In some examples, the attributes also indicate that any circuitry used to process the user data conform to a minimum security requirement (e.g., that the circuitry be tamper-proof, spoof proof, etc.). In some examples, the user, when agreeing to share the user data with the data operator 104, is not aware that the user data may be operated on by a data compute agent 106 and is only concerned that the attributes be satisfied.

In some examples, the user device 102 is situated on premises of the data operator 104. In some examples, the user device 102 remains at the premises of the data operator 104 for a period of time demarcated with a time frame (e.g., 1:00 PM to 5:00 PM EST). The premises of the data operator 104 can be any location owned by, associated with, or otherwise within the control of the data operator 104. In some examples, the premises of the data operator 104 are an amusement park, an office space, a warehouse, a shopping center, an outdoor or indoor park, a restaurant, campground, a hotel, an overnight lodging, a gas station, a traveler's roadside oasis, a salon, etc. In some examples, the data operator 104 solicits access to the user data collected by the user device 102. In some examples, the access is solicited via communications delivered to the user device 102. In some examples, the access is solicited via a kiosk or other station at which a user device 102 can be registered. The user may be agreeable to permitting the data operator 104 to access the user data for a limited purpose and for a limited time and at a limited location but may have concerns that the user data can be used for purposes that are unknown, unforeseeable, and potentially harmful to the user. The user data attribute-based data protection protocol disclosed herein gives the data operator 104 tools by which to address the user's concerns. In some examples, the data operator 104 provides the user with the ability to limit the usage and processing of the data to a specified location, and a specified time, and can even give the user the ability to specify any processing/storing operations that are (or are not) permitted to be performed on the user data.

In some examples, the data operator 104 gives the user an option to limit any processing of the user data to the location of the premises of the data operator 104. In some examples, the data operator 104 gives the user an option to limit any processing of the user data to within a time frame during which the user (and, therefore, the user device 102) will be at the premises of the data operator 104. Further, the data operator 104 can give the user the option to limit usage of the user data to real-time processing, such that the user data is never stored by the data operator 104 (or by any entity operating on the data on behalf of the data operator 104 (e.g., the data compute agents 106). In some such examples, when the user device 102 is on the premises of the data operator 104, the data operator 104 can collect user data from the user device 102 and process the user data. In the same such examples, the data operator 104 is obligated to stop collecting and processing the user data when the user leaves the premises of the data operator 104. Thus, the user is assured that the user data is not stored indefinitely but is instead deleted at the end of the timeframe specified by the user. As a result, any risk that the user data ends up being used for purposes outside of agreed upon purposes is reduced.

In some examples, the data operator 104 gives the user an option to limit any processing of the user data to a location that extends beyond the boundaries of the premises of the data operator 104. In some such examples, the data operator 104 may give the user an option to limit any processing of the user data to a geopolitical boundary (e.g., one or more cities, counties, provinces, states, countries, an alliance of countries, etc.), a geographical boundary (e.g., a continent, an island, etc.), etc. In some examples, the location at which the user data is to be processed is indicated as a geographic region specified by a set of global positioning system (GPS) coordinates. In some such examples, the data operator 104 can opt to have a third party entity (e.g., a data compute agent 106) that is located away from the premises of the data operator 104 and that is separate from the data operator 104 process the user data, provided that the third party entity does so in accordance with the user specified attributes.

In some examples, the third party entity/data compute agent has a relationship/agreement with the data operator 104. The agreement/relationship includes using the user data attribute-based data protection protocol to govern how, when and where the user data is to be processed. In some examples, to ensure adherence with the relationship, the data compute agent 106 identifies agent attributes. The agent attributes can indicate where the data compute agent 106 is located (e.g., a GPS-based set of coordinates), and also indicate a time during which the data compute agent 106 is providing (or will be providing) processing services. In addition, the agent attributes are generated on trusted silicon/hardware componentry/circuitry. The silicon/hardware/circuitry component is configured to have a minimum level of security to reduce the risk that the data compute agent 106 falsifies location and time information. Further, the silicon/hardware componentry/circuitry is configured to perform the user data attribute-based data protection protocol. In some examples, the minimum level of security indicates that the silicon/hardware component includes a tamper-proof GPS circuitry for generating GPS location data for the data compute agent 106 and include a tamper-proof time source for generating a time/date stamp. As the GPS circuitry and time source are tamper proof, a data compute agent 106) having such a GPS circuitry and such a time source cannot generate fake location data or an altered time/date data. Thus, when the data compute agent 106 provides location and time information, the data operator 104 is assured of where the data compute agent 106 is located and can be assured that the data compute agent 106 cannot be untruthful about data processing times. As such, a trusted silicon/hardware vendor can, in this way, provide end to end data protection because all of the user device(s) 102, the data operator(s) 104, and the data compute agents 106 include the trusted hardware/silicon of the vendor.

In some examples, when a data operator 104 elects to have a data compute agent 106 process user data, the data compute agent 106 is to identify its agent attributes. The data operator 104 can then compare the agent attributes to the user data attributes. If the user data attributes are satisfied by the agent attributes, then the data operator 104 provides the data compute agent 106 with access to the user data for processing.

Figure 2:
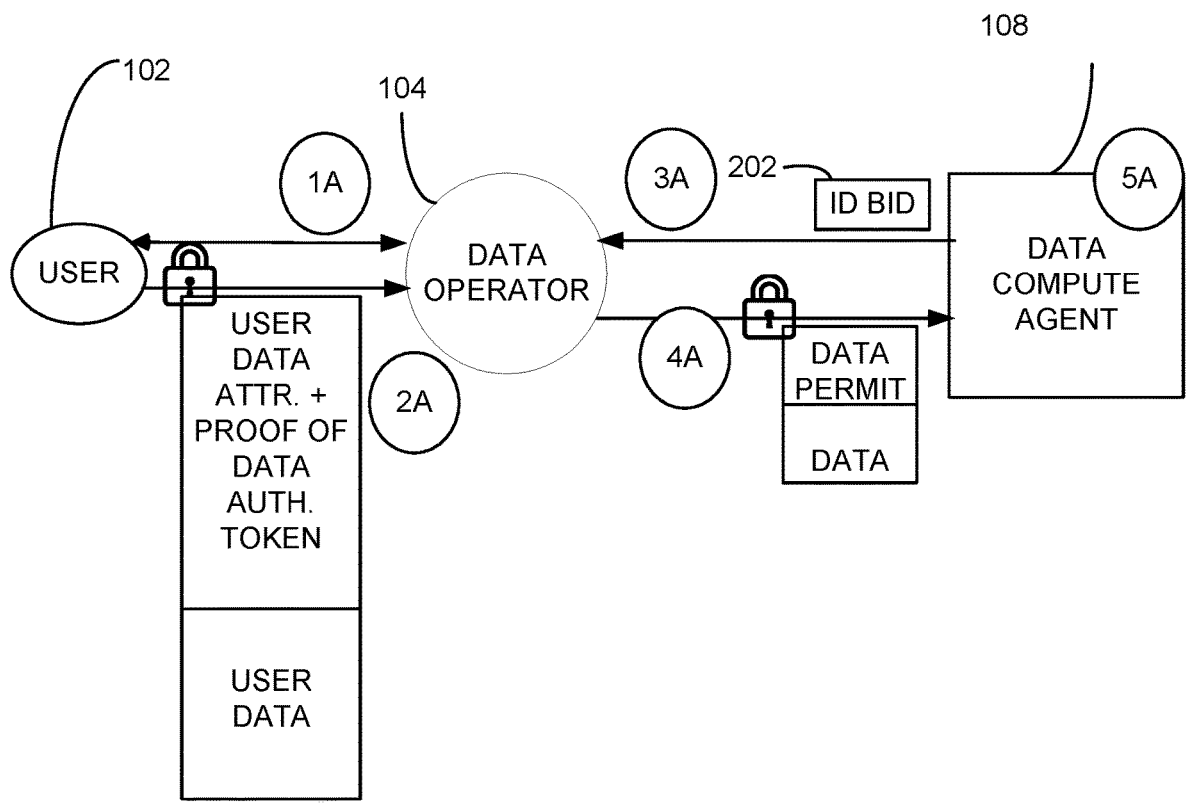
FIG. 2 is a block diagram of an example first implementation of the user data attribute-based data protection protocol.

FIG. 2 is a schematic diagram that illustrates a first example of the attribute-based data protection protocol disclosed herein. As described above, the protocol is used to govern a series of communications between the user device 102, the data operator 104, and the data compute agent 106.

The protocol also governs a manner in which user data generated at the user device 102 can be collected by the data operator 104, communicated by the data operator 104 to the data compute agent 106, and processed by the data compute agent 106. In some examples, the user data can be collected by the data operator 104 and operated on by the data operator 104 without need to use the services of the data compute agent 106. The data protection protocol is configured to use attributes of the user (e.g., attributes specified by the user via the user device 102, attributes associated with the user, etc.) and attributes of the data compute agent 106 to ensure that the user data is protected when being processed by the data compute agent 106.

In some examples, the user-specified attributes of the attributes-based protocol govern who can access the user data, when and where the user data can be accessed, and what operations can (or cannot) be performed on the data. In some examples, the protocol includes the user specifying which of any of the attributes, (e.g., who, when, where, what) are to be met before, during and (in some cases) after the processing of the user data. In some examples, the user-specified attributes are specified by the user via the user device 102 and the data operator 104 (see FIG. 1) promises to use the user-specified attributes (also referred to as "user data attributes") to keep the user data safe.

In some examples, a user can specify that the user data is only to be processed within a geographical region (e.g., a geographical region A (attribute 1)), within a time frame "T1-T2" (attribute 2), by a data compute agent 106 having circuitry that is trusted (e.g., circuitry that meets a minimum security criteria) (attribute 3). In addition, the user can limit the operations to be performed by the data operator 104 on the user data (attribute 4). For example, the user attributes can specify an operation(s) that can be performed on the user data (i.e., is permitted) or can specify an operation(s) that is/are not to be performed on the user data (i.e., operations that are not permitted). In some examples, the user data attributes can specify that any operations can be performed on the data except for a storage operation. In some examples, the user data attributes can specify that the user data can be stored within the specified timeframe but must be deleted before or upon termination of the timeframe.

To enforce the user data attributes, the user data attribute-based data protection protocol requires that any of the data compute agents 106 (or, in some examples, the data operator 104) that operate on the user data satisfy the user-specified attributes. In some examples, the data compute agents 106 are each associated with attributes (e.g., agent attributes) and, when the protocol is deployed, any of the data compute agents 106 engaged to process the user data must have agent attributes that satisfy the user-specified attributes. Likewise, the data operator 104 can be associated with data operator 104 attributes that are to be satisfied before the data operator 104 can operate on the user data.

In some examples, agent attributes (and/or the attributes of the data operator 104 when the data operator 104 is to process the user data 104) can include the same types of attributes as the user data attributes including a geographical region "A" (attribute 1) within which the data compute agent 106 (and/or the data operator 104) is located, a time frame "T1-T2" (attribute 2) within which the data compute agent 106 (and/or the data operator 104) is to process the data, and a trusted circuitry attribute that requires that only data compute agents 106 (and data operators 104) that have trusted circuitry (attribute) can operate on the data. In some examples, trusted circuitry is circuitry can be silicon/hardware componentry/circuitry that is tamper proof and that includes a tamper proof GPS device and a tamper proof source of time. In addition, the agent attributes can include one or more operations that the data compute agent 106 (and/or data operator 104) can perform and/or operations that the data compute agent 106 (and/or the data operator 104) will forego upon request (attribute 4).

As illustrated in FIG. 2, the user data attribute-based data protection protocol can be used for the protected processing of user data by one or more of the data compute agents 106. In some examples, the data operator 104 engages with one or more of the data compute agents 106 to process user data. In some examples, relationships between the data operator 104 and the individual data compute agents 106 are established before any data processing activities are undertaken. In some such examples, the data operator 104 and each of the individual data compute agents 106 negotiate data processing agreements that govern how the data operator 104 and data compute agents 106 are to cooperate to ensure handling of the user data in a protected manner.

In some examples, the individual data compute agents 106 supply cryptographic signature information to the data operator 104 for use in verifying/authenticating future communications received by the data operator 104 that purport to be from any of the individual data compute agents 106 are, indeed, from the individual agent. As such, data compute agents 106 that have an agreement with the data operator 104 are treated by the data operator 104 as trusted agents (also referred to as trusted data compute agents 106). The data compute agents 106 that have an agreement with the data operator 104 and that are referred to as trusted data compute agents may have trusted circuitry, in some examples, and may not have trusted circuitry in some examples. The data compute agents that are referred to as "trusted" but do not include trusted circuitry, are "trusted" in the sense that the behaviors exhibited by the data compute agents has been trustworthy.

Referring still to FIG. 2, assuming that the data operator 104 has negotiated agreements with the individual data compute agents 106 under which the individual data compute agents 106 will process data, then the user data attribute-based data protection protocol can be used to effect transfer of the user data for processing. In some examples, the data protection protocol starts with a first communication from the data operator 104 to the user device 102 (see encircled number 1A) by which the data operator 104 seeks the user's permission to access the user data on the user device 102 and further seeks to obtain user data attributes with which to protect the user data. The user data attribute-based data protection protocol continues when the user device 102 responds to the request for data and attributes (see encircled number 2A). In some examples, the user device 102 may respond by denying the request for user data in which case the protocol ends.

In some examples, the user device 102 responds to the request from the data operator 104 by supplying the user data and the user data attributes. In some examples, the user device 102 encrypts the user data and the user data attributes. In addition, the user device 102 attaches (or otherwise incorporates) a unique cryptographic signature (also referred to as a "proof of data authenticity" token) to the encrypted user data. The proof of authenticity token can include, for example, a date/time stamp, location information (identifying a location where the user data was generated), and any other of a variety of information types. The user device 102 generates the proof of authenticity token based on a device specific key that is part of the silicon component/circuitry of the user device 102. In some examples, the device specific key (also referred to as a private key) is based on a secret (e.g., a secret serial number, a secret alphanumeric sequence, etc.) burnt into the silicon/hardware component/circuitry of the user device 102.

The proof of authenticity token is used by a recipient (e.g., the data operator 104 and/or the data compute agent 106) to verify that the hardware (componentry/circuitry) that generated the user data is trustworthy (e.g., not compromised in any way). In this way, the recipient of the user data (e.g., the data operator 104 and/or the data compute agent 106) is assured that the date/time/location information is not fake. In some examples, the recipient accesses a public key to verify the proof of authenticity token and thereby verify the silicon/hardware componentry/circuitry of the sender of the token. In some such examples, the public key can be available via a silicon manufacturer's or supplier website. As such, a recipient (e.g., the data operator 104 and/or the data compute agent 106) that is able to successfully verify the proof of authenticity token is assured that the componentry/circuitry is trusted and, therefore, the accompanying data is valid and can be trusted. In some examples, when the data operator 104 and/or the data compute agent 106 determine that the public key cannot be used to verify the proof of authenticity token, the data operator 104 and/or data compute agent 106 determines that the proof of authenticity token and accompanying data are not to be trusted. In some such examples, the data operator 104 and/or the data compute agent 106 discard the received information (user data and any information included therewith) and can also record information regarding the received information in association with information about the user device 102 that purported to send the received information. In some examples, the recorded information is used to evaluate the trustworthiness of any future information received from the same user device 102.

In some examples, the example user device 102 transmits the encrypted user data and user data attributes, along with the proof of authenticity token, to the example data operator 104 via a secure channel (e.g., TCP/TLS). In some examples, the user device 102 includes secure communication equipment to generate/open secure communication channels with the data operator 104. In some examples, the secure channels are implemented as secure sessions that can remain open so that additional handshaking need not occur every time the user device 102 sends more user data.

In some examples, the user device 102 signs the proof of authenticity token with an ephemeral key generated by trustworthy hardware instead of a private key. The usage of an ephemeral key instead of a private key can prevent the data compute agent 106 from tracking the user device 102 based on the private key and thereby affords the user an extra layer of privacy. The ephemeral key, in some such examples, can be generated based on manufacturer hardware information but may not include information identifying a specific piece or component of hardware.

In some examples, the data operator 104 stores the user data and user data attributes in association with identification information that uniquely identifies the source of the user data and the user data attributes 102. The data protection protocol continues when the data compute agent 106 is ready to process the user data under the agreement between the data compute agent 106 and the data operator 104 and communicates an identity bid ("ID BID") to the data operator 104 (see encircled number 3A). In some examples, the ID BID is generated by trusted hardware of the data compute agent 106 and can include an authorization token that includes agent attributes such as, for example, a geographical location of the data compute agent 106, a current date/time stamp generated by the data compute agent 106, etc. The authorization token is also cryptographically signed with a private key by the hardware of the data compute agent 106 to ensure that the ID BID cannot be spoofed. As described above with respect to the proof of authenticity token, the authorization token can be cryptographically signed using a private key that is generated based on characteristics of (or information about) a part of the silicon/hardware component/circuitry of the data compute agent 106. In some examples, the private key of the data compute agent 106, much like the private key of the user device 102, is based on a secret (e.g., a secret serial number, a secret alphanumeric sequence, etc.) burnt into the silicon/hardware component/circuitry of the data compute agent 106.

Upon receipt of the ID BID, the data operator 104 verifies that the hardware and/or software of the data compute agent 106 that sent the ID BID is trustworthy and capable of enforcing the security policies required by the user device 102 and/or the data operator 104. In some examples, the data operator 104 performs the verification by using a public key to verify the cryptographic signature of the ID BID. When the cryptographic signature is verified, the data operator 104 can work with the data compute agent 106. When the cryptographic signature cannot be verified by the data operator 104, the data operator 104 will not work with the data compute agent 106.

In some examples, as described above, the silicon/hardware componentry/circuitry of the data compute agent 106 has a secret burnt into the silicon/hardware component/circuitry. The secret burnt into the silicon/hardware component/circuitry indicates that the silicon/hardware componentry/circuitry is trusted/trustworthy. Further, a private key is generated based on this secret and used to cryptographically sign the ID BID.

Thus, when the cryptographic signature of the ID BID can be verified, the data operator 104 is assured that the hardware/silicon componentry/circuitry that generated the ID BID is tamper proof and includes a tamper proof GPS sensor, and a tamper proof time source. By ensuring that the GPS sensor and time source are tamper proof, the data operator 104 is assured that the data compute agent 106 is unable to create a false time/stamp or a false GPS location in the ID BID. Thus, the data operator 104 is assured that the data compute agent 106 having the tamper proof circuitry can be trusted with the respect to its agent location attribute and its agent time attribute.

In addition, the example data operator 104 compares the user data attributes to the agent attributes to determine whether the agent attributes satisfy the user data attributes. For example, the data operator 104 compares a user data location attribute to an agent location attribute. The agent location attribute specifies a location at which the agent is located and is generated by a GPS location device of the data compute agent 106 hardware/silicon componentry/circuitry. The user data location attribute can specify a geographical region. If the data operator 104 determines that the agent location attribute lies within the geographical region specified by the user data location attribute, then the user data location attribute is satisfied. Similarly, the agent time attribute can specify a time period or timeframe (or a quality of service level) within which the data compute agent will process user data. A user data time attribute can specify a timeframe within which the user data is to be processed or can specify an expiration time after which the user data can no longer be processed. In some examples, when the data operator 104 determines that the timeframe specified in the agent time attribute falls within the timeframe or before the expiration time specified in the user data time attribute, the agent time attribute is determined to satisfy the user data time attribute.

In some examples, the agent time attribute can indicate an amount of time within which user data received at the data compute agent will be processed (e.g., a data processing turnaround time), and the user data time attribute can specify an expiration time (also referred to as an end-processing time) by which all processing of user data is to be complete. In some such examples, provided that a first time equal to the turnaround time plus a current time at which the user data is to be sent to the data compute agent is equal to a second time that occurs before the expiration time, the data operator 104 can be assured that the agent time attribute satisfies the user data time attribute.

Provided that the ID BID is verified and the user data attributes are satisfied by the agent attributes, the data operator 104, transmits, or otherwise provides the data compute agent 106 with access to, the user data and the data permit (see encircled 4A). In some examples, once the data operator 104 has verified the ID BID, the data operator 104 sends the user data and the user data permit in a secure communication channel.

As described above, the user data permit includes the user data attributes. As different user devices 102 can have (and likely will have) different data attributes, the data operator 104 sends a corresponding data permit with each user data transmission so that the data compute agent 106 is sure to apply the corresponding user data attributes to the appropriate user data. Further, the data compute agent 106 need not be and typically is not aware of any identity of the user. Instead, the data compute agent 106 merely needs to know the data permit that corresponds to each user data.

In some examples, upon receiving access to the user data permit and the user data, the data compute agent 106 performs a review of the user data permit (e.g., the user data attributes) to ensure that it can satisfy the user data attributes. If the data compute agent 106 cannot satisfy the user data attributes, then the data compute agent 106 discards the user data. The data compute agent 106 may also send a message to the data operator 104 indicating that the user data will not be processed.

In some examples, the data operator 104 sends the locked user data before the ID BID is received (instead of supplying the user data after checking that the user data attributes are satisfied). In some such examples, when the data operator 104 determines (based on the verification of the ID BID) that the agent attributes of the data compute agent 106 satisfy the user data attributes, the data operator 104 supplies a cryptographic key to the data compute agent 106 to be used to gain access to the user data. In accordance with the user data attribute protection protocol, the data compute agent 106 uses the cryptographic key to unlock the user data and user data permit, processes the user data (see encircled number 5A), and subsequently supplies the results to the example data operator 104.

In some examples, the data operator 104 also transmits (to the data compute agent 106) the proof of authenticity token generated by the user device 102 that generated the user data. In some such examples, the need to send the proof of authenticity token may have been included in the data operator 104/data compute agent agreement. In some examples, the data compute agent 106 uses the proof of authenticity token to verify that the user data was generated by a trusted circuitry of a user device 102. If the data compute agent 106 is unable to verify the proof of authenticity token, the data compute agent 106 refuses to process the user data. In some such examples, the data compute agent 106 discards the user data and can send a notification (e.g., a message) to the example data operator 104 indicating that the user data is invalid (not trusted).

Figure 3:
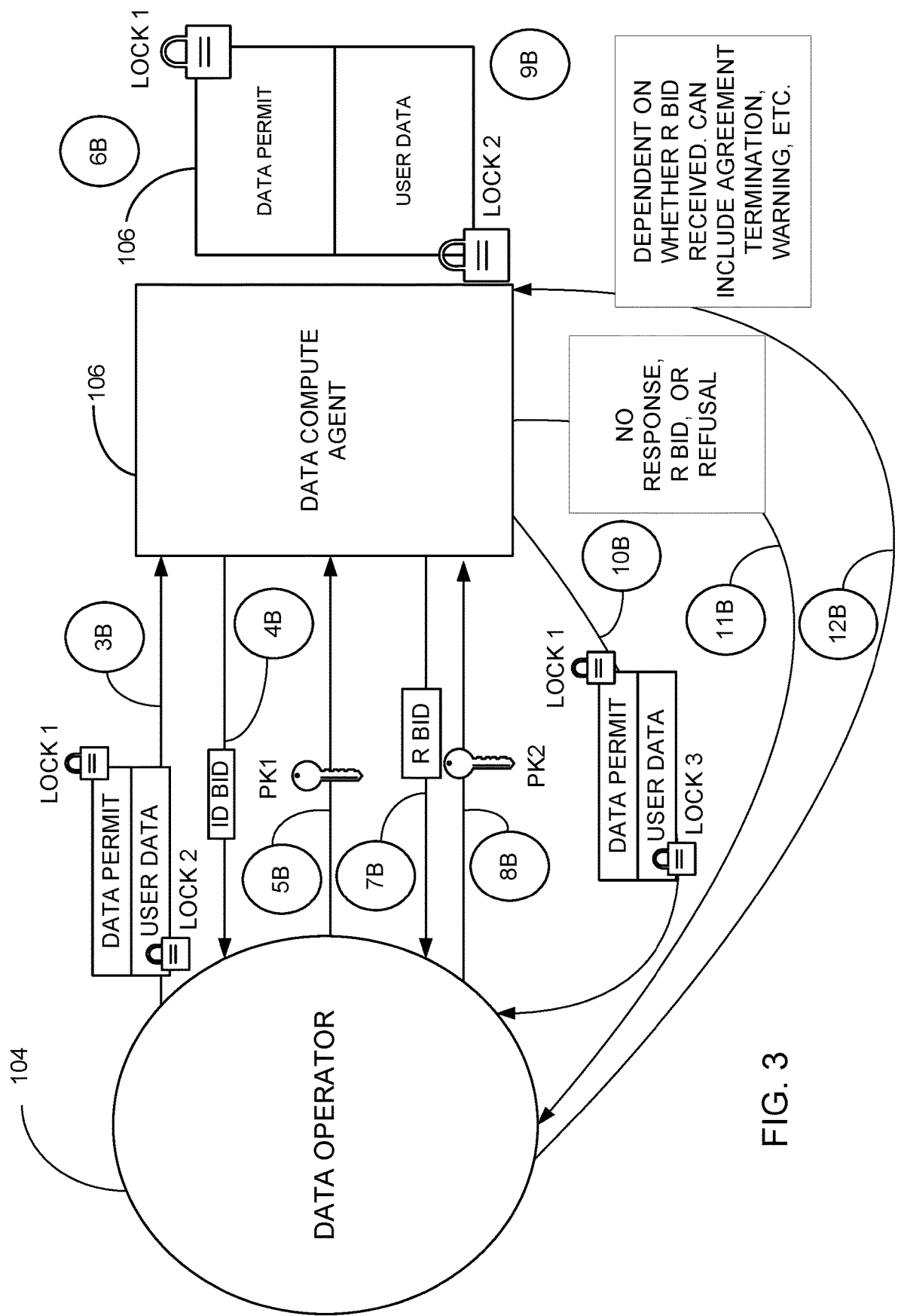
FIG. 3 is a block diagram an example second implementation of the user data attribute-based data protection protocol.

FIG. 3 is a schematic diagram that illustrates a second example implementation of the attribute-based data protection protocol disclosed herein. The second example attribute-based protection protocol (also referred to herein as a data protection protocol), is focused on communications between the data operator 104 and the data compute agent 106 because the communications between the user device 102 and the data operator 104 described with respect to the first example implementation of the attributed-based data protection protocol (see FIG. 2) are also used in the second example implementation of the attribute-based data protection protocol. In particular, the example communications illustrated in FIG. 2 with the encircled numbers 1A and 2A can also be used to effect communication between the user device 102 and the data operator 104 when using the second example implementation of the attribute-based data protection protocol of FIG. 3.

After the user data has been supplied by the user device 102 to the example data operator 104, the data operator 104 provides the user data and the user data attributes (also referred to as a data permit) to the data compute agent 106 (see encircled 3B). In some examples, the data operator 104 uses a first key, "PK1," to generate a first lock, "LOCK 1," for the data permit and uses a second key to generate a second lock, "LOCK 2," for the user data. In some examples, the LOCK1 and LOCK2 are encrypted versions of the plaintext user data permit and user data, respectively, that are generated using symmetric cryptographic keys PK1/PK2 with standard algorithms. The data compute agent 106, lacking the first key PK1 and the second key PK2, is not able to access either the user data permit information or the user data upon receipt.

In some examples, responsive to receipt of the locked data permit and the locked user data, the data compute agent 106 (which has previously entered into a data processing agreement with the data operator 104), sends an ID BID to the data operator 104. As described above in connection with FIG. 2, the ID BID is generated by trusted hardware of the data compute agent 106 and includes an authorization token that includes agent attributes such as, in some examples, the geographical location of the data compute agent 106, descriptive information about the hardware/circuitry of the data compute agent 106, a current date/time stamp, etc. The hardware of the data compute agent 106 also cryptographically signs the ID BID with a private key to ensure that the ID BID cannot be spoofed. As described above, with respect to the first implementation of the data protection protocol (see FIG. 2), the private key can be generated based on a secret burnt into the silicon/hardware componentry/circuitry such that, by verifying the ID BID, the data operator 104 is assured that the ID BID was generated using trusted silicon/hardware. As described above, the data operator 104 has a public key (or can access a public key) for use in verifying the cryptographic signature.

Upon receipt of the ID BID, the data operator 104 uses the public key to verify the cryptographic signature of the ID BID and thereby verify that the ID BID was generated on trusted silicon/hardware. When the cryptographic signature can be verified, the data operator 104 is assured that the data compute agent 106 is a trusted agent that uses trusted/trustworthy silicon/hardware componentry/circuitry that is tamper proof and includes at least a tamper proof GPS location device and, in some examples, can also be configured to enforce the user policies (e.g., process the data in accordance with the user data attributes). Provided that the cryptographic signature can be verified, the data operator 104 records the agent attributes and any additional information included in the ID BID. In some examples, the data operator 104 records/stores the agent attributes and any additional information in a log associated with the data compute agent 106 that generated the ID BID. As described further hereinbelow. In some examples, the data operator 104 can later access recorded agent attributes and any additional information to determine whether the data compute agent 106 has been acting in accordance with the agent attributes and any additional information.

In some examples, after the example data operator 104 has recorded the agent attributes and any additional information included in the ID BID have been recorded, the data operator 104 transmits the first key, PK1, to the data compute agent 106 for use in unlocking the data permit (see encircled number 5B). The data compute agent 106 uses the first key, PK1, to unlock the data permit and thereby gain access to the user data attributes and any additional information included in the data permit. The data compute agent 106 then determines whether it can satisfy the user data attributes (see encircled number 6B). In some such examples, determining whether the data compute agent 106 can satisfy the user data attributes includes the data compute agent 106 comparing its own agent attributes to the user data attributes included in the permit. If the comparison indicates that the agent attributes do not satisfy the user data attributes, then the data compute agent 106 discards both the data permit and the locked user data and does not have further correspondence with the data operator 104 regarding that user data. In some examples, the data compute agent 106 also sends a message to the data operator indicating that the user data cannot be processed for failure to satisfy the user data attributes.

In some examples, if the comparison indicates that the agent attributes do satisfy the user data attributes, then the data compute agent 106 transmits a responsive bid ("R BID") (see encircled number 7B) to the example data operator 104. The data operator 104, responds to the R BID by transmitting the second key, PK2, to the data compute agent 106 for use in accessing (unlocking) the user data (see encircled number 8B). Thus, in the example implementation of the data protection protocol illustrated in FIG. 3, the data operator 104 need not determine whether the agent attributes satisfy the user-attributes but can instead rely on both the determination made by the data compute agent 106 (see encircled number 6B) as well as the auditing technique described below.

In some examples, the data compute agent 106 processes the user data accordance with the user data attributes (see encircled number 9B) and, when the example data compute agent 106 has finished processing the user data, results of the processing are supplied to the example data operator 104 which uses the results in accordance with any user data attributes and/or supplies information (which may, but need not be, based on the results) to the user device 102.

In some examples, the example data compute agent 106 indicates that the proof of authenticity token generated by the user device 102 is to be transmitted to the data compute agent 106 by the example data operator 104 along with the second key PK2 (or at any point in the series of communications represented in FIG. 3). In some examples, the data compute agent 106 uses the proof of authenticity token to verify that the user data was generated by trusted hardware.

In some examples, when the proof of authenticity token of the user device 102 is not verifiable, the data compute agent 106 can reject any requests to process the user data. By rejecting requests to process user data that are not associated with trusted hardware, the data compute agent 106 reduces the possibility of attack by a nefarious actor. In this manner, the user data attribute-based data protection protocol disclosed herein can operate not only as a permit but also as a passport by which a data processing system (e.g., the data compute agent 106) can accept or reject a data processing assignment based on whether a data generating device (e.g., the user device 102) uses (or is otherwise associated with trusted hardware) and by which a data operator 104 can accept or reject the processing services of a data compute agent 106 based on whether the data compute agent 106 uses trusted hardware.

As described with respect to FIG. 3, the data compute agent 106 sends an ID BID that includes its own agent attributes (see the encircled number 4B). Then, after receiving the first key PK1, the data compute agent 106 unlocks the data permit communicated by the example data operator 104 and determines whether its own agent attributes satisfy the user data attributes included in the permit. In some examples, the data compute agent 106 determines that its own agent attributes do not satisfy the user data attributes included in the permit. In some examples, the data compute agent 106, in light of this determination, returns a message indicating that it cannot process the user data or simply sends nothing back to the data operator 104.

In some examples, when the example data operator 104 receives a message from the data compute agent 106 indicating that it cannot process the data (or does not receive any request for PK2), the data operator 104 compares the agent attributes obtained from the ID BID that was received earlier from the data compute agent 106 to the user attributes included in the data permit. If the comparison indicates that the agent attributes obtained from the ID BID do satisfy the user attributes of the data permit, the data operator 104 records information indicating that the data compute agent 106 sent conflicting information regarding its agent attributes because the ID BID included agent attributes that satisfy the user data attributes but the message (or lack of a request for PK2) indicating that the data compute agent 106 cannot process the user data suggests that the agent attributes of the data compute agent 106 do not satisfy the user attributes.

In some examples, the example data operator 104 records the conflicting information for use in generating in a trusted agent ranking. The trusted agent ranking is adjusted based on behaviors exhibited by the data compute agent 106 during the relationship between the data compute agent 106 and the data operator 104. For example, the data operator 104 can record a first ID BID sent by the data compute agent 106 at a first time and a second ID BID sent by the same data compute agent 106 at a second time. In some examples, the data operator 104 compares the first ID BID and second ID BID and records any conflicts and/or changes between the two ID BIDs. In short, any information supplied by the data compute agent 106 that does not align with other information supplied by the same data compute agent 106 can be recorded as a conflict or as an indication that there may be a conflict. The information can be used to adjust the trusted agent ranking.

In some examples, the example data operator 104 will use audit messages (and the responses received thereto) to assess the trustworthiness of the example data compute agents 106 and/or adjust corresponding trusted agent ranking. In some such examples, the user data can be sent in batches. In some examples, the user data can also be collected from the user device 102 by the data operator 104 in batches. In some examples, the data operator 104 includes a timeframe in a first data permit communicated with a first batch of the user data (see encircled number 3B). In some such examples, the timeframe can be a user data attribute identifying a time period within which the user data is to be processed by the data compute agent 106. In some examples, the data operator 104 sends a second user data batch outside of the timeframe included in the first data permit (see encircled number 10B). Further, the second user data batch is locked with a third key, "PK3," and can include, for example, bogus data. If the data compute agent 106 is trustworthy, then the data compute agent 106 complies with the data permit by refusing to process the second user data batch (because it was sent outside of the timeframe attribute). The data compute agent 106 can communicate this refusal by not sending an R BID or by sending a message indicating that the second batch of user data was transmitted outside of the user data timeframe attribute (see encircled 11B) and cannot, therefore, be processed. Thus, if the data operator 104 receives a refusal from the data compute agent 106 or receives no response at all, the data operator 104 can use that information to update the trusted agent ranking corresponding to the data compute agent 106. In such examples, the trusted agent ranking for the data compute agent 106 will improve.

If the data operator 104 receives an R BID from the data compute agent 106 indicating that the data compute agent 106 will process the user data, the data operator 104 can also use that information to update the trusted agent ranking. In such an instance, the trusted agent ranking will worsen to thereby indicate that the trustworthiness of the data compute agent 106 has decreased. In response to the second R BID, the data operator 104 will not send a key to unlock the second user data batch and can, in some examples, send a message indicating that the data compute agent 106 is not trustworthy, that the agreement is terminated, that the data compute agent 106 will not be receiving further data batches for processing, a warning that further deceit will result in termination of the agreement, or any other message content that the data operator 104 deems appropriate (see encircled number 12B).

In some examples, the example data operator 104, after performing the protocol described with respect to FIG. 3 to have a first user data batch (that was locked with the second key PK2) processed by the data compute agent 106, can test the trustworthiness of the data compute agent 106 by sending a second user data batch that is locked with a third key, PK3. The second user data batch is also transmitted with a second data permit that is locked with the first key, PK1. However, in this instance, the second data permit includes user data attributes that conflict with the user data attributes included in the first data permit. In some examples, the user data attributes of the second data permit can include a geographical location that is different from a geographical location that is included in the user data attributes of the first data permit (e.g., the geographical region of the first data permit is distinct from, and does not overlap with, the geographical region of the second data permit.

In some examples, when the data compute agent 106 responds to the second user data batch with an R BID that indicates that the data compute agent 106 can process the second user data batch, the data operator 104 uses this information to update the trusted agent ranking. In this instance, the data operator 104 changes the trusted agent ranking for the worse to indicate that the data compute agent 106 is not trustworthy (or is less trustworthy than previously judged). If, instead, the data compute agent 106 responds to the receipt of the second user data batch with a refusal to process the second user data batch, the data operator 104 changes the trusted agent ranking for the better to indicate that the data compute agent 106 is behaving in a trustworthy manner.

Figure 4:
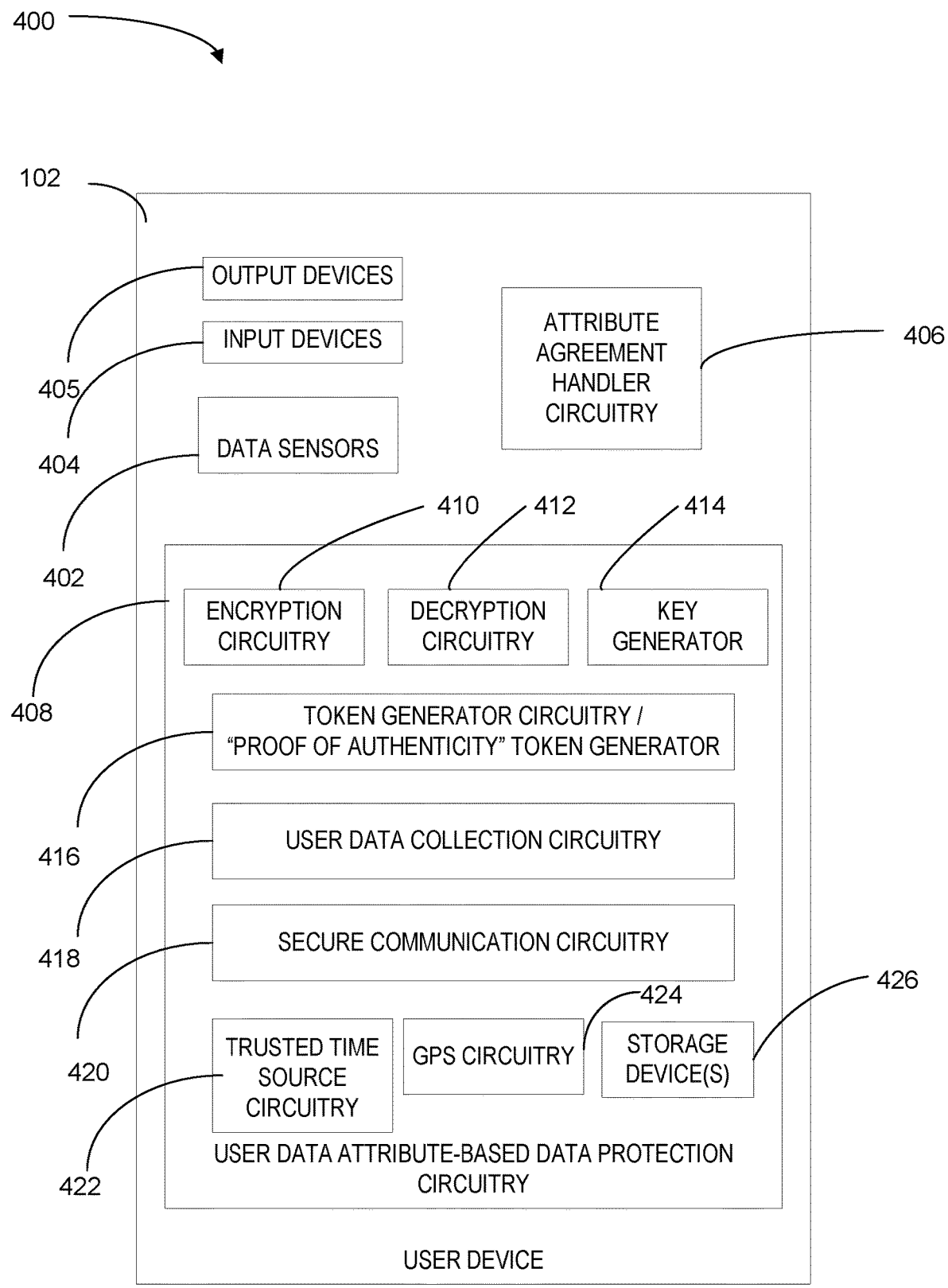
FIG. 4 is a block diagram of the user device included in FIG. 1.

FIG. 4 is a block diagram 400 of the example user device 102. In some examples, the user device 102 is to generate user data and cooperate with the example data operator 104 to allow secure communication and processing of the user data. In some examples, the user data is to be protected using the user data attribute-based data protection protocol described above. In some examples, the protocol includes the user specifying user data attributes (e.g., who, when, where, what) that are to be satisfied by any entity (e.g., the data compute agent 106 and/or the data operator 104 106) that is to process the user data. In some examples, the user device 102 specifies the set of attributes to be applied and the data operator 104 (see FIG. 1) promises to use the user-specified attributes (also referred to as "user data attributes") to keep the user data safe.

In some examples, the user device 102 of FIG. 1, FIG. 2 and FIG. 4 may be instantiated (e.g., creating an instance of, bring into being for any length of time, materialize, implement, etc.) by processor circuitry such as a central processing unit executing instructions. Additionally, or alternatively, the user device 102 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

In some examples, the example user device 102 includes example data sensors 402, example input devices 404, example output devices 405, an example attribute agreement handler circuitry 406, and an example user data attribute-based data protection circuitry 408. In some examples, the user data attribute-based data protection circuitry 408 includes example encryption circuitry 410, example decryption circuitry 412, example key token generator circuitry 414, example token generator circuitry 416 ("proof of authenticity token" generator), example user data collection circuitry 418, example secure communication circuitry 420, example trusted time source circuitry 422, and example global positioning system circuitry 424.

In some examples, the attribute agreement handler circuitry 406 receives a request to share user data from the example data operator 104 (see FIG. 1). In some examples, in response to the request to share user data, the attribute agreement handler circuitry 406 prompts the user to specify (1) whether the user wishes to share user data, (2) which, if any, user data is to be shared, and (3) one or more attributes that are to be used to protect the user data. In some examples, the request to share user data identifies the type of user data being requested. In some examples, the attribute agreement handler circuitry 406 prompts the user to specify which types of data the user would like to share. In some examples, the attribute handler circuitry 406 causes a prompt for the user to specify the attribute information to appear on (or be emitted by) any of the output devices 405, causes a prompt for the user to specify types of data to be shared to be displayed (or otherwise output), and/or causes information identifying what data is being requested to be displayed (or otherwise output) so that the user can either agree or disagree (via any of the input devices 404) to share the displayed types of data. The user device supplies the user data attributes and identifies the types of data to be shared via any of the input devices 404. In some examples, the attribute agreement handler circuitry 406 communicates this information to the data operator 104 (FIG. 1) and informs the user data attribute-based data protection circuitry 408 of the selected user data attributes. In some examples, the user data attribute based-data protection circuitry 408 includes one or more storage devices 426 at which the user data attributes and/or the collected user data is to be stored.

In some examples, in response to being informed that user data is to be shared in accordance with a user data attribute-based data protection protocol, the example user data collection circuitry 418 of the example user data attribute-based data protection circuitry 408 begins to collect the data that the user has agreed to share. In some examples, the example token generator circuitry 416 of the example user data attribute-based data protection circuitry 408, in response to being informed that user data is to be shared in accordance with the attribute-based protection protocol, generates a proof of authenticity token. The proof of authenticity token can be generated based on (or otherwise include) one or more of a location of the user device 102 generated by the GPS circuitry 424, a current date stamp and time stamp generated by the example trusted time source 422, a silicon component number associated with the example user data attribute based data protection circuitry 408, etc. In some examples, the silicon component number is any sequence of numbers, letters, or combination of alphanumeric symbols and is burnt into the silicon by a manufacturer during the manufacturing process. In some examples, the token generator circuitry 416 is implemented as a cryptographic signature generator. In some examples, the encryption circuitry 410 encrypts the collected user data (and the user data attributes) based on a key produced by the key generator 414 and then signs the encrypted user data with the authorization token. In some examples, the example secure communication circuitry 420 opens a secure communication channel with the example data operator 104 and transmits the encrypted and signed user data to the data operator 104 via the secure communication channel. In some examples, the secure communication circuitry is configured to open the secure communication channel via TCP or TLS. In some examples, the user data is communicated to the data operator 104 in batches, at a single time, or upon request by the data operator 104.

In some examples, the example user data attribute-based data protection circuitry 408 is implemented as a silicon component that is tamper proof such that any information including the GPS location information supplied by the GPS circuitry 424, the time/date information supplied by the trusted time source 422, and the token generated by the example token generator circuitry 416 can be trusted. As the example user data attribute-based data protection circuitry 408 is implemented as a silicon component that is tamper proof, the user data attribute-based data protection circuitry 408 is defined herein as a trusted circuitry. Being tamper proof, the authenticity of the source of the data is assured and the information generated (e.g., the token, the GPS data and the time/date stamps) cannot be falsified. In some examples, the user data attribute-based data protection circuitry 408 is trusted circuitry in that, in addition to being tamper proof, it is configured to perform the user data attribute-based data protection protocol disclosed herein. In some examples, the key generated by the example key generator 414 that is used to cryptographically sign the poof of authenticity token is generated based on the silicon secret that it burnt into the hardware of the user-data attribute-based data protection circuitry 408. In some such examples, the secret uniquely identifies the serial number of the hardware of the user-data attribute-based data protection circuitry 408. In some examples, the serial number has been identified by a manufacturer of the user-data attribute-based data protection circuitry 408 as tamper proof.

Figure 5:
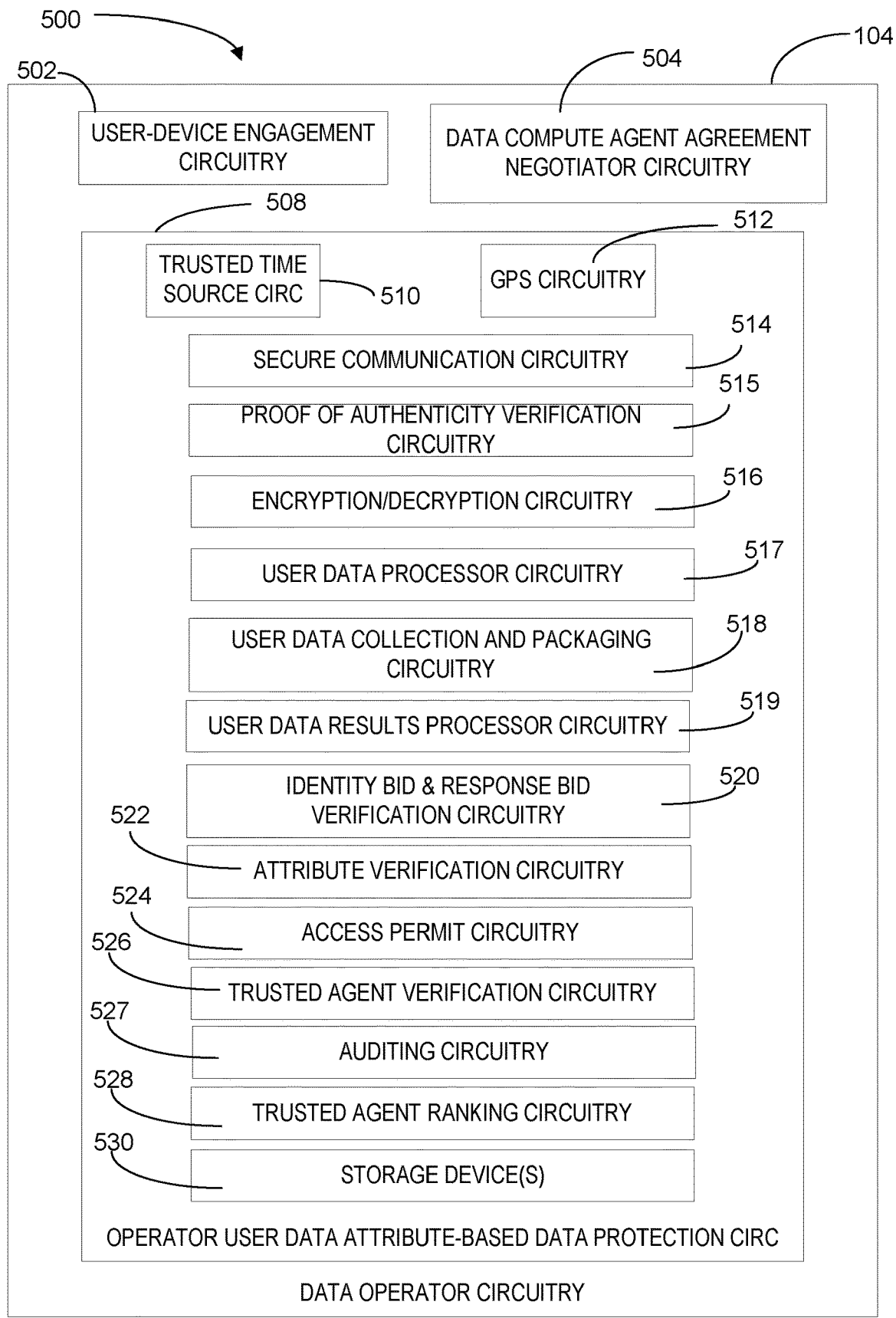
FIG. 5 is a block diagram of the data operator included in FIG. 1.

FIG. 5 is a block diagram 500 of the example data operator 104 of FIG. 1. In some examples, the data operator 104 is to obtain user data from the user device 102 in exchange for a promise to keep the data safe/protected based on a set of user data attributes specified by the user. The data operator 104 may then choose to engage one or more of the example data compute agents 106 (see FIG. 1) to process the user data provided that the data operator 104 can trust the data compute agent 106 to process the user data in accordance with the user-specified user data attributes. In some examples, and as described above, the user data attributes are part of the user data attribute-based data protection protocol (examples of which are supplied in FIGS. 2 and 3) that governs who can access the user data, when and where the user data can be accessed, and what operations can (or cannot) be performed on the user data. In some examples, data operator 104 uses the user data attribute-based data protection protocol to determine a trusted agent ranking indicative of a trustworthiness of the data compute agent 106.

In some examples, the example data operator 104 of FIG. 1, FIG. 2, FIG. 3 and FIG. 5 may be instantiated (e.g., creating an instance of, bring into being for any length of time, materialize, implement, etc.) by processor circuitry such as a central processing unit executing instructions. Additionally, or alternatively, the data operator 104 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

In some examples, the example data operator 104 includes example data operator circuitry 104 that includes an example user device engagement circuitry 502, an example data compute agent agreement negotiator circuitry 504, and example operator user data attribute-based data protection circuitry 508. In some examples, the operator user data attribute-based data protection circuitry 508 includes an example trusted time source circuitry 510, example GPS circuitry 512, example secure communication circuitry 514, example proof of authenticity verification circuitry 515, example encryption/decryption circuitry 516, example user data processing circuitry 517, example user data collection and packaging circuitry 518, example user data results processor circuitry 519, example identity bid and response bid verification circuitry 520, example attribute verification circuitry 522, example access permit circuitry 524, example trusted agent verification circuitry 526, example auditing circuitry 527, example trusted agent ranking circuitry 528, and one or more example storage device(s) 530. In some examples, the user-device engagement circuitry 502 engages with a user device 102 to obtain permission to collect user data from the device in exchange for a promise to keep the user data protected using attributes specified by a user of the user device 102. In some examples, the user-device engagement circuitry 502 supports communication with the user device 102 to seek, and, if possible, obtain the permission to access the user data and to obtain a set of attributes from the user device 102. The attributes from the user device 102, also referred to as user data attributes, are to be used to protect the user data from access by unauthorized entities in accordance with the user data attribute-based data protection protocol disclosed herein.

The example data compute agent agreement negotiator circuitry 504 is to negotiate with the example data compute agents 106A, 106B, 106C. The data compute agent agreement negotiator circuitry 504 can use any of a variety of communication techniques to engage with the data compute agents 106 (individually) for the purpose of negotiating data processing agreements by which the data compute agents 106 will supply data processing services to the data operator 104. Under the agreements, the data operator 104 supplies user data to individual ones of the data compute agents 106 for processing and the data compute agents 106 are to process the user data in accordance with user attributes supplied with (or in association with) the user data to be processed. In some examples, the data compute agent agreement negotiator circuitry 504 collects an identifying cryptosignature (a cryptographic signature) from the data compute agents 106A, 106B, 106C, for use in identifying future communications from the data compute agents 106A, 106B, 106C. In some examples, the data compute agent agreement negotiator circuitry 504 can send a private key, e.g., PK1, for use in unlocking data permits to be transmitted by the data operator 104 to the data compute agents 106 in the future.

In some examples, the example trusted time source and the example GPS circuitry provide a date/time stamp and a GPS location coordinate(s), respectively. In some examples, the date/time stamp and the GPS location coordinates are treated as user data agent attributes of the data compute agent 106. In some examples, the data operator 104 uses the agent attributes to determine whether one or more user data attributes included in a data permit are satisfied. If satisfied, the data operator 104 can transmit data to the data compute agent 106 in accordance with the protocol identified in FIG. 2 and/or FIG. 3.

In some examples, the secure communication circuitry 514 of the example data operator 104 is to securely communicate any of the protocol communications discussed above in connection with FIG. 2 and FIG. 3. In some examples, the secure communication circuitry 514 establishes a TCP/TLS session/channel to communicate with the example data compute agent 106 (FIGS. 1, 2, 3, and 6) and with the example user device 102 (FIG. 1 and FIG. 4).

In some examples, the example encryption/decryption circuitry 516 of the example data operator 104 is to encrypt and/or decrypt any of the communications as described with respect to the user attribute based data protection protocols of FIG. 2 and FIG. 3. In some examples, the user data collection and packaging circuitry 518 collects (receives, accesses, requests) user data from the user device 102 in accordance with the user-device/data operator 104 agreement and further packages the user data for transmission to a data compute agent 106 for processing in accordance with a data compute agent/data operator 104 agreement. In some examples, the user data collection and packaging circuitry 518 receives the proof of authenticity token with the user data and the user attribute data. In some such examples, the user data collection and packaging circuitry 518 provides the proof of authenticity token to the example proof of authenticity verification circuitry 515 to be verified. In some examples, the proof of authenticity verification circuitry 515 can use a public key to verify the proof of authenticity token. In some such examples, the proof of authenticity verification circuitry 515 uses the public key to verify the proof of authenticity token. If the proof of authenticity token cannot be verified, the proof of authenticity verification circuitry 515 notifies the user data collection and packaging circuitry 518 which responds by discarding the corresponding user data attributes. As described above, in some examples, verifying the proof of authenticity token includes verifying a crypto-signature used to sign the proof of authenticity token. As described above, the crypto-signature can be generated at the user device based on a secret embedded in the silicon of the user data attribute-based protection circuitry 408.

If the proof of authenticity token can be verified by the example proof of authenticity verification circuitry 515, the example user data collection and packaging circuitry 518 can determine, based on the user attributes included in the token, whether the data is to be processed at the data operator 104 or can be processed at any of the data compute agents 106. For example, if the data operator 104 has the processing capacity, the user data collection and packaging circuitry 518 may determine that the data operator circuitry is to process the user data. In some such examples, the user data collection and packaging circuitry 518 can supply the user data and the corresponding user data attributes to the example user data processing circuitry 517 for processing. Any results generated at the example user data processing circuitry 517 can be supplied back to the user device 102 if the user opted to receive such results back. In some examples, the results include information that can improve the user's visit to the premises of the data operator 104. or otherwise In some examples, the user data results processing circuitry 519 may take any number of actions based on the data processing results.

In some examples, the user data and user data attributes arrive at the user data collection and packaging circuitry 518 encrypted. In some such examples, the user data collection and packaging circuitry 518 causes the user data and the user data attributes received from the user device 102 (see FIGS. 1, 2 and/or 4) to be decrypted by the example encryption/decryption circuitry 516. In some examples, the user data collection and packaging circuitry 518 can then re-package the decrypted user data (also referred to herein as user data batch(es)) with a corresponding decrypted data permit that includes a corresponding set of user data attributes. The user data collection and packaging circuitry 518 additionally can make the re-packaged user data and data permit available to the encryption/decryption circuitry 516 for encrypting prior to being sent to the example data compute agent 106.

In some examples, the example identity bid and response bid verification circuitry 520 of the example data operator 104 is to verify or validate any identity bids received from any of the example data compute agents 106A, 106B, 106C in accordance with the user data attribute-based data protection protocol of FIG. 2 and/or FIG. 3. In some examples, the identity bid and response bid verification circuitry 520 verifies the ID BID by verifying a crypto-signature attached to the ID BID. In some examples, the crypto-signature indicates that the silicon/hardware of the data compute agent 106 from which the ID BID was received includes trusted hardware. As described above, in some examples, the presence of the trusted hardware includes the presence of a trusted (i.e., tamper-proof GPS circuitry) and the presence of a trusted (i.e., tamper-proof) time source circuitry.

In some examples, the example trusted agent verification circuitry 526 of the example data operator 104 is to verify/validate that a crypto-signature included with ID BID is a same crypto-signature as was provided by the data compute agent 106 during the agreement negotiation. In some such examples, verification of the crypto-signature may indicate that the source of ID BID is "trusted" in the sense that the corresponding data compute agent 106 has an agreement with the data operator 104.

In some examples, when the ID BID and R BID verification circuitry 520 and/or the trusted agent verification circuitry 526 have successfully verified the ID BID, the trusted agent verification circuitry can simply let processing of the ID BID and/or the R BID continue, can acknowledge the verification is complete to the access permit circuitry 524, can cause the attribute verification circuitry 522 to begin verifying agent attributes included in the ID BID, etc. In some examples, when neither the ID BID and R BID verification circuitry 520 nor the trusted agent verification circuitry 526 is able to verify that the silicon/hardware componentry/circuitry that generated the ID BID and/or the R BID is trusted or that the data compute agent 106 that sent the ID BID and/or R BID is under operating under an agreement, the access permit circuitry 524 can be notified that verification has failed such that the access permit circuitry 524 does not permit the data compute agent 106 to access the user data and/or takes any number of other steps to ensure that the data compute agent 106 does not gain access to the user data.

In some examples, when the ID BID and/or R BID is successfully verified, the attribute verification circuitry 522 compares the agent attributes included in the ID BID with user data attributes of a batch of user data. When the agent attributes satisfy the user data attributes, the data compute agent is able to process user data in compliance with the user data attributes. When the agent attributes do not satisfy the user data attributes, the identity bid and response bid verification circuitry 520 can determine the data compute agent 106 is not able to process user data in compliance with the user data attributes. In some examples, based on whether the user data attributes are satisfied by the agent attributes, the identity bid and response bid verification circuitry 520 can cause the example access permit circuitry 524 to provide the corresponding data compute agent 106 with access to the user data. In some examples, access to the user data is provided by transmitting a private key (e.g., PK2) by which the user data was encrypted prior to transmission to the data compute agent.

In some examples, the example attribute verification circuitry 522 of the example data operator 104 is to forego verification of the ID BID and/or the R BID and is instead to record information included in the ID BID and/or an R BID. In some such examples, the identity bid and the response bid verification circuitry 520 is to supply information regarding the recorded bids to the example trusted agent ranking circuitry 528 or to the example auditing circuitry 527. In some such examples, either of the trusted agent ranking circuitry 528 and/or the example auditing circuitry 527 can use the recorded bid information to compare to other R BIDs and/or ID BIDs received from the same data compute agent 106 for use in building a history of trust behavior, as described further below.

In some examples, the example auditing circuitry 527 generates (or causes the generation of) auditing messages (also referred to as "audit bids") to be supplied to the data compute agents 106 in accordance with the user data attribute-based data protection protocol of FIG. 2 and FIG. 3. In some examples, the auditing circuitry 527 generates an audit bid that includes a data permit and user data that is to be sent to one of the data compute agents 106. The audit bid appears to a data compute agent 106 as any other data permit and user data message. However, in some examples, the data permit of the audit bid conflicts with a data permit that was earlier sent to the same data compute agent 106 in connection with the user data of the same user. In some examples, the conflict between the two different data permits arises because the user data attributes included in the two different data permits do not agree. As a result, any attempt by a same data compute agent 106 to satisfy the different data permits will fail. Thus, if the data compute agent 106 in receipt of the conflicting data permits responds to each of the conflicting data permits with a corresponding positive R BID, then the data compute agent 106 has exhibited a behavior that is indicative/suggestive of being untrustworthy. In some such examples, the positive R BID means that the data compute agent 106 has indicated that it can process the user data corresponding to the conflict data permit and still adhere to the user data attributes.

In some examples, the example auditing circuitry 527 causes the R BID verification circuitry to identify any positive R BIDs that are responsive to an audit bid and to send a notification to the auditing circuitry 527 of the receipt of such positive R BIDs. The auditing circuitry 527 can then respond to any such notifications by providing information about the positive R BIDs and the associated data compute agents 106 to the example trusted agent ranking circuitry 528. The trusted agent ranking circuitry 528 can use the positive R BID information to adjust corresponding trusted agent rankings and can, if called for, take any desired corrective, protective action as described further below.

In some examples, the example trusted agent ranking circuitry 528 uses information supplied by the example auditing circuitry 527 to adjust trusted agent rankings (each associated with a different one of the data compute agents 106). In some examples, the information supplied by the auditing circuitry 527 identifies behaviors of the data compute agents 106. The behaviors can be indicative or suggestive of trustworthiness or of untrustworthiness of corresponding ones of the data compute agents 106. The trusted agent ranking circuitry 528 uses the behavior information to adjust a ranking of the corresponding ones of the data compute agents 106. The trusted agent rankings provide a gauge as to the trustworthiness of corresponding ones of the data compute agents 106. In some examples, a trusted agent ranking can reach a level at which the trusted agent ranking circuitry 528 notifies the access permit circuitry 524 that a corresponding one of the data compute agents 106 is to be prohibited from further access to any user data of any user. In some examples, the trusted agent ranking of a data compute agent 106 can reach a level at which the trusted agent ranking circuitry 528 causes the auditing circuitry 527 to increase or decrease auditing frequencies of different ones of the data compute agents 106.

Figure 6:
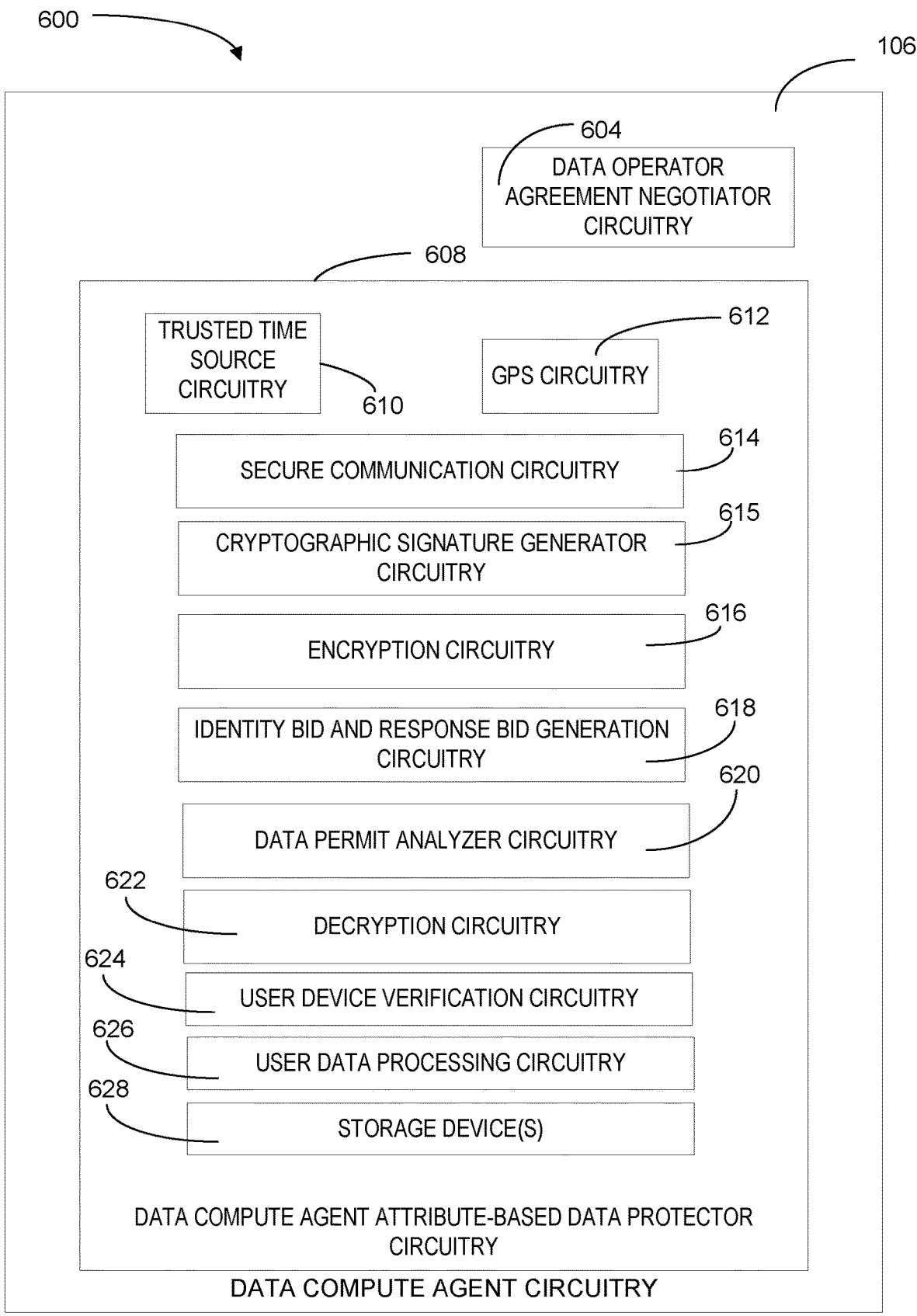
FIG. 6 is a block diagram of the data compute agent included in FIG. 1.

FIG. 6 is a block diagram 600 of the example data compute agent 106 of FIG. 1, FIG. 2, and FIG. 3. In some examples, the data compute agent 106 engages with the example data operator 104 (see FIG. 1) to process user data provided by the data operator 104 in accordance with the user data attribute-based data protection protocol of FIG. 2 and FIG. 3.

In some examples, the data compute agent 106 of FIG. 1, FIG. 2, FIG. 3 and FIG. 6 may be instantiated (e.g., creating an instance of, bring into being for any length of time, materialize, implement, etc.) by processor circuitry such as a central processing unit executing instructions. Additionally, or alternatively, the data compute agent 106 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by one or more virtual machines and/or containers executing on the microprocessor.

In some examples, the example data compute agent 106 includes example data operator agreement negotiator circuitry 604, and example data compute agent attribute-based data protector circuitry 608. In some examples, the data compute agent attribute-based data protector circuitry 608 includes example trusted time source circuitry 610, example GPS circuitry 612, example secure communication circuitry 614, example cryptographic signature generator circuitry 615, example encryption circuitry 616, example identity bid and response bid generation circuitry 618, example data permit analyzer circuitry 620, example decryption circuitry 622, example user device verification circuitry 624, example user data processing circuitry 626 and one or more example storage devices 628. In some examples, the data operator 104 engagement circuitry 604 is to engage with the example data operator 104 for the purpose of negotiating data processing agreements by which the data compute agent 106 will supply data processing services of user data to the data operator 104. Under the agreement, the data compute agent 106 processes user data in accordance with user data attributes to be supplied with the user data. In addition, in some examples, the data operator agreement negotiator circuitry 604 causes the example cryptographic signature generator circuitry 615 to generate a crypto-signature and supplies the crypto-signature to the data operator 104. The data operator 104 can use the crypto-signature to verify that information purporting to be from the data compute agent 106 is indeed from the actual data compute agent 106. In some examples, the cryptographic signature generator circuitry 615 generates the cryptographic signature based on a secret (key) burnt into the silicon.

In some examples, the example trusted time source circuitry 610 and the example GPS circuitry 612 provide a date/time stamp and a GPS location coordinate(s), respectively. In some examples, the date/time stamp and the GPS location coordinates are treated as agent attributes of the data compute agent 106. In some examples, the agent attributes are used by the data permit analyzer 620 to determine whether the agent attributes satisfy a set of user data attributes transmitted by the example data operator 104 in a data permit. In some examples, when the data permit analyzer 620 determines that the user data attributes are satisfied, the data permit analyzer 620 can instruct the example identity bid and response bid generation circuitry 618 to generate an identity bid and/or a response bid. In some examples, the identity bid is generated based on the agent attributes.

In some examples, the secure communication circuitry 614 of the data compute agent 106 is to securely communicate any of the protocol communications discussed above in connection with FIG. 2 and FIG. 3. In some examples, the secure communication circuitry 514 establishes a TCP/TLS session/channel to communicate with a data operator 104.

In some examples, the example encryption circuitry 618 of the example data operator 104 is to encrypt any of communications generated at the example data compute agent 106. In some examples, the encryption circuitry 618 operates at the command of the identity bid and response bid generation circuitry 618, as described further below. In some examples, the identity bid and response bid generation circuitry 618 generates an identity bid when and as described in connection with the user data attribute-based data protection protocol of FIG. 2 and FIG. 3.

In some examples, the example identity bid and response bid generation circuitry 618 supplies agent attributes to the example encryption circuitry 616 for use in generating an ID BID. In some examples, the identity bid and response bid generation circuitry 618 causes the trusted time source 610 and the GPS circuitry 612 to send time and location information to the encryption circuitry 616 for use in generating an authorization token that is used as the identity bid.

In some examples, the identity bid and response bid generation circuitry 618 generates a response bid (R BID) that contains an assent to process data, or in some cases, a denial of data processing services. In some examples, identity bid and response bid generation circuitry 618 generates the response bid after receiving a signal from the data permit analyzer 620 indicating that the response bid (R BID) is to be generated.

In some examples, the example data permit analyzer circuitry 620 receives data permits from the secure communication circuitry 614. In response to receipt of a data permit, the data permit analyzer circuitry 620 compares user data attributes included in the data permit to agent attributes generated, at least in part, by the example trusted time source 610 circuitry and the example GPS circuitry 612. In some examples, when the data permit analyzer 620 determines that the user data attributes are satisfied by agent attributes of the data compute agent 106, the data permit analyzer 620 informs the user data processing circuitry 626 that the user data can be legitimately processed. In addition, the data permit analyzer circuitry 620 can notify the example identity bid and response bid generation circuitry 618 that a response bid (R BID) is to be generated.

In some examples, the data permit analyzer 620 analyzes a data permit by comparing the user data attributes included in a current data permit to user data attributes included in an earlier-received data permit. In some examples, the earlier-received data permit and the current data permit are from the same data operator 104 and are associated with user data from a same user. In some examples, when the data permit analyzer circuitry 620 determines that the user data attributes of the current data permit conflict with user data attributes of the earlier-received data permit, the data permit analyzer circuitry 620 informs the user data processing circuitry 626 that the user data cannot be legitimately processed. The user data processing circuitry 626 processes the user data (or does not process the user data) in response to (and in accordance with) communications from the data permit analyzer 620.

In some examples, the example secure communication circuitry 614 receives crypto-keys PK1, PK2, PK3, etc. from the example data operator 102 (see FIG. 1, FIG. 2 and/or FIG. 5) which it then supplies to the example decryption circuitry 622. The example decryption circuitry 622 uses the keys to decrypt appropriate ones of incoming communications (e.g., user data and/or user data permits) in accordance with the user data attribute-based data protection protocol of FIG. 2 and FIG. 3.

In some examples, the user device verification circuitry 624 verifies whether user data was generated by a user device 102 having trusted circuitry. In some examples, the user device verification circuitry 624 uses a proof of authenticity token supplied with, or in association with, the user data to determine whether the user device 102 is associated with trusted silicon/hardware componentry/circuitry, as described above.

While an example manner of implementing the example user device 102 of FIG. 1 and FIG. 2 is illustrated in FIG. 4, one or more of the elements, processes, and/or devices illustrated in FIG. 4 may be combined, divided, re-arranged, omitted, eliminated, and/or implemented in any other way. Further, the example data sensors 404, the example input devices 404, the example output devices 405, the example attribute agreement handler circuitry 406, the example user data attribute-based data protection circuitry 408, the example encryption circuitry 410, the example decryption circuitry 412, the example key generator 414, the example token generator circuitry 416, the example user data collection circuitry 418, the example secure communication circuitry 420, the example trusted time source circuitry 422, and the example global positioning system circuitry 424, example storage device(s) 426, and/or, more generally, the example user device 102 of FIG. 4, may be implemented by hardware alone or by hardware in combination with software and/or firmware. Thus, for example, any of the example data sensors 404, the example input devices 404, the example output devices 405, the example attribute agreement handler circuitry 406, the example user data attribute-based data protection circuitry 408, the example encryption circuitry 410, the example decryption circuitry 412, the example key generator 414, the example token generator circuitry 416, the example user data collection circuitry 418, the example secure communication circuitry 420, the example trusted time source circuitry 422, and the example global positioning system circuitry 424, example storage device(s) 426, and/or, more generally, the example user device 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example user device 102 of FIG. 4 may include one or more elements, processes, and/or devices in addition to, or instead of, those illustrated in FIG. 2, and/or may include more than one of any or all of the illustrated elements, processes and devices.

While an example manner of implementing the example data operator 104 device of FIGS. 1, 2 and 3 is illustrated in FIG. 5, one or more of the elements, processes, and/or devices illustrated in FIG. 5 may be combined, divided, re-arranged, omitted, eliminated, and/or implemented in any other way. Further, the example user device 102 engagement circuitry 502, the example data computer agent agreement negotiator circuitry 504, the example operator user data attribute-based data protection circuitry 508, an example trusted time source circuitry 510, example GPS circuitry 512, example secure communication circuitry 514, example proof of authenticity verification circuitry 515, example encryption/decryption circuitry 516, example user data processing circuitry 517, example user data collection and packaging circuitry 518, example user data results processor circuitry 519, example identity bid and response bid verification circuitry 520, example attribute verification circuitry 522, example access permit circuitry 524, example trusted agent verification circuitry 526, example auditing circuitry 527, example trusted agent ranking circuitry 528, the one or more example storage device(s) 530, and/or, more generally, the example data operator circuitry 104 of FIG. 5, may be implemented by hardware alone or by hardware in combination with software and/or firmware. Thus, for example, any of the example user device 102 engagement circuitry 502, the example data computer agent agreement negotiator circuitry 504, the example operator user data attribute-based data protection circuitry 508, an example trusted time source circuitry 510, example GPS circuitry 512, example secure communication circuitry 514, example proof of authenticity verification circuitry 515, example encryption/decryption circuitry 516, example user data processing circuitry 517, example user data collection and packaging circuitry 518, example user data results processor circuitry 519, example identity bid and response bid verification circuitry 520, example attribute verification circuitry 522, example access permit circuitry 524, example trusted agent verification circuitry 526, example auditing circuitry 527, example trusted agent ranking circuitry 528, the one or more example storage device(s) 530, and/or, more generally, the example data operator circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example data operator circuitry 104 of FIG. 5 may include one or more elements, processes, and/or devices in addition to, or instead of, those illustrated in FIG. 5, and/or may include more than one of any or all of the illustrated elements, processes and devices.

While an example manner of implementing the example data compute agent circuitry 106 of FIGS. 1, 2 and 3 is illustrated in FIG. 6, one or more of the elements, processes, and/or devices illustrated in FIG. 6 may be combined, divided, re-arranged, omitted, eliminated, and/or implemented in any other way. Further, the example data operator agreement negotiator circuitry 604, the example data compute agent attribute-based data protector circuitry 608, example trusted time source circuitry 610, example GPS circuitry 612, example secure communication circuitry 614, example cryptographic signature generator circuitry 615, example encryption circuitry 616, example identity bid and response bid generation circuitry 618, example data permit analyzer circuitry 620, example decryption circuitry 622, example user device verification circuitry 624, example user data processing circuitry 626 one or more example storage devices 628, and/or, more generally, the example data compute agent circuitry 106 of FIG. 6, may be implemented by hardware alone or by hardware in combination with software and/or firmware. Thus, for example, any of the example data operator agreement negotiator circuitry 604, the example data compute agent operator attribute-based data protector circuitry 608, example trusted time source circuitry 610, example GPS circuitry 612, example secure communication circuitry 614, example cryptographic signature generator circuitry 615, example encryption circuitry 616, example identity bid and response bid generation circuitry 618, example data permit analyzer circuitry 620, example decryption circuitry 622, example user device verification circuitry 624, example user data processing circuitry 626, one or more example storage devices 628, and/or, more generally, the example data compute agent circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example data compute agent circuitry 106 of FIG. 6 may include one or more elements, processes, and/or devices in addition to, or instead of, those illustrated in FIG. 6, and/or may include more than one of any or all of the illustrated elements, processes and devices.

Figure 7:
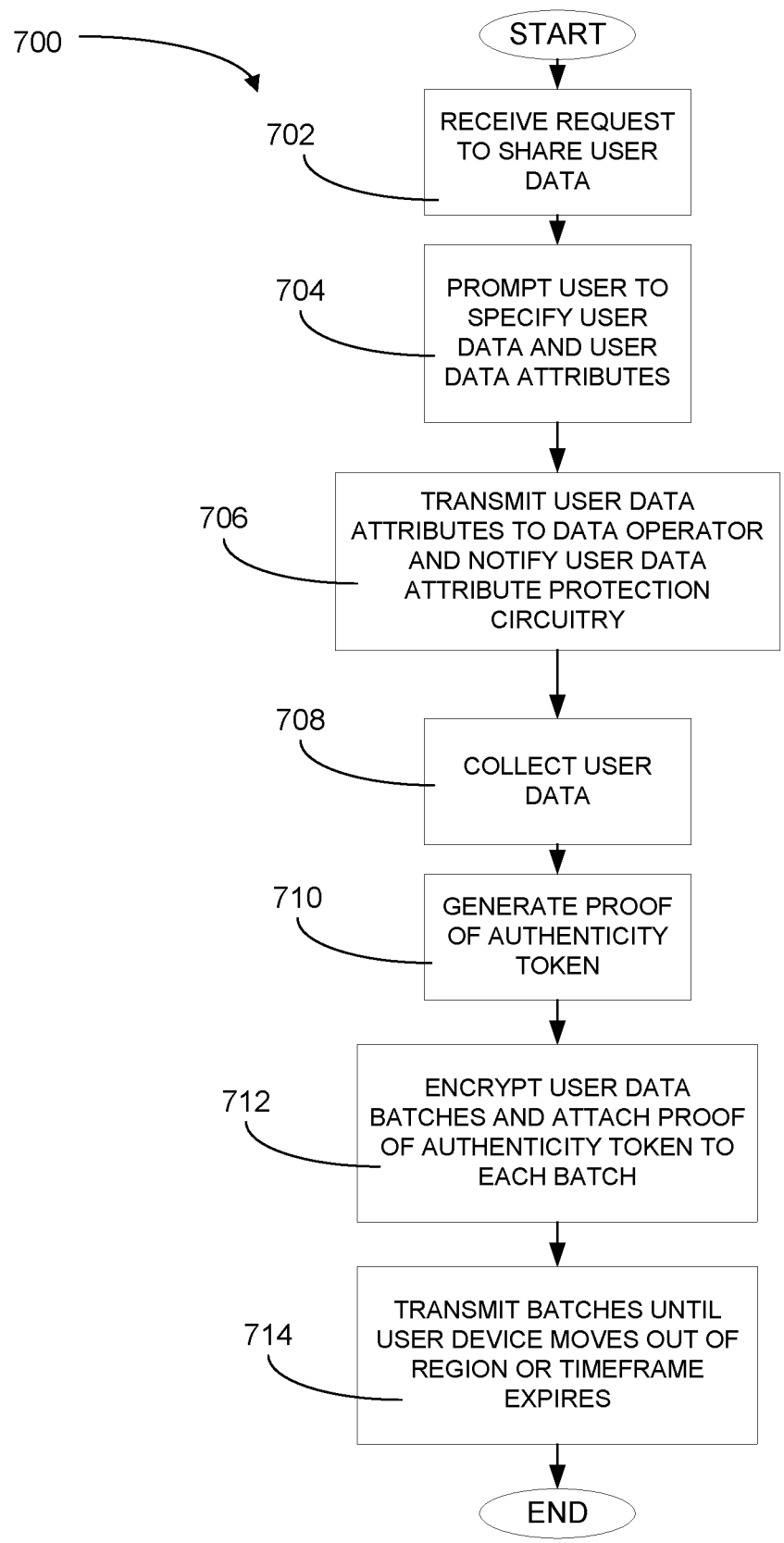
FIG. 7 is a flowchart representative of example machine readable instructions and/or example operations that may be executed by example processor circuitry to implement the user device of FIGS. 1, 2, and 4.
Figure 12:
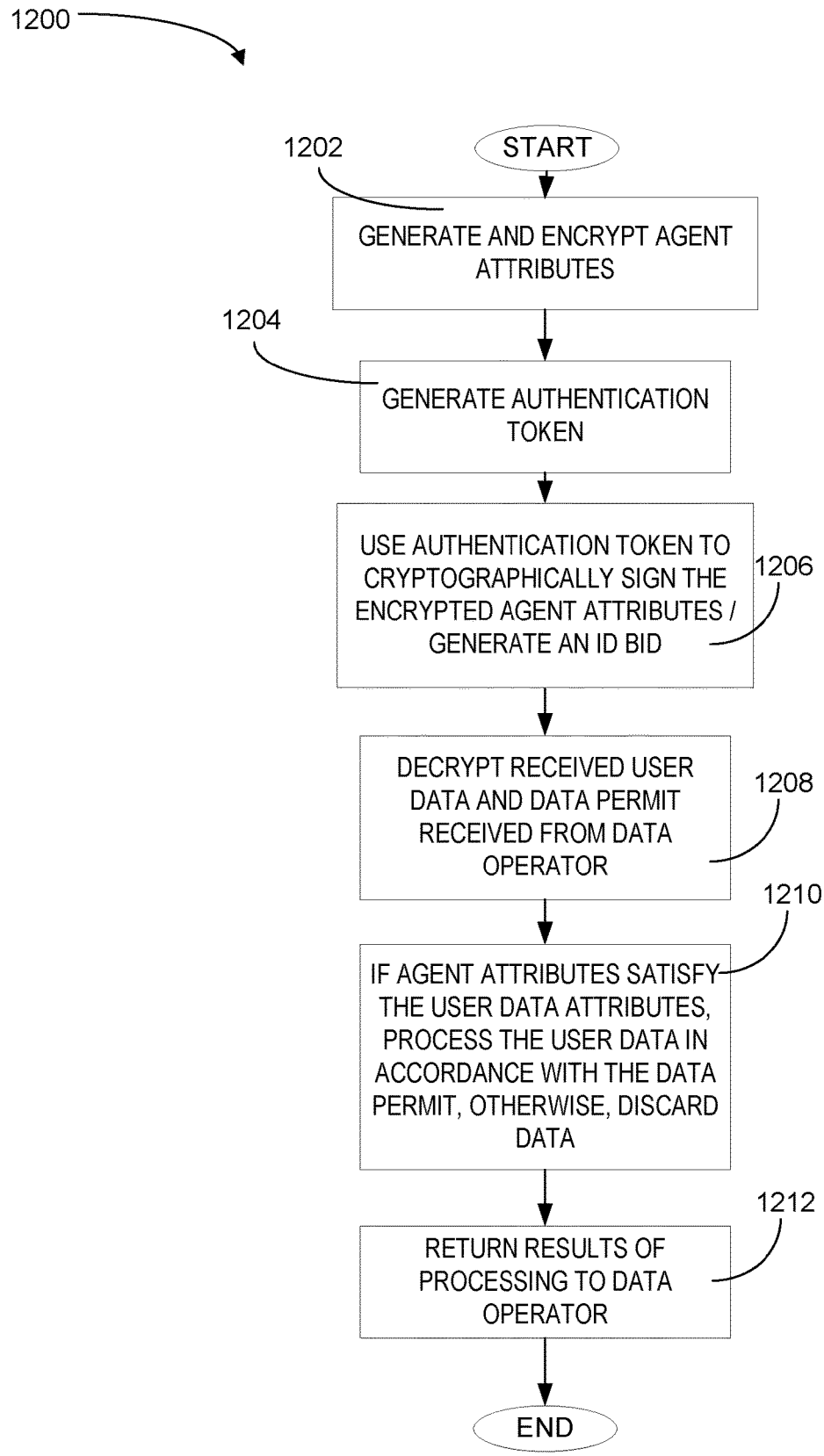
FIG. 12 is a flowchart representative of example machine readable instructions and/or example operations that may be executed by example processor circuitry to implement the data compute agent of FIGS. 1, 2, 3 and 6.
Figure 13:
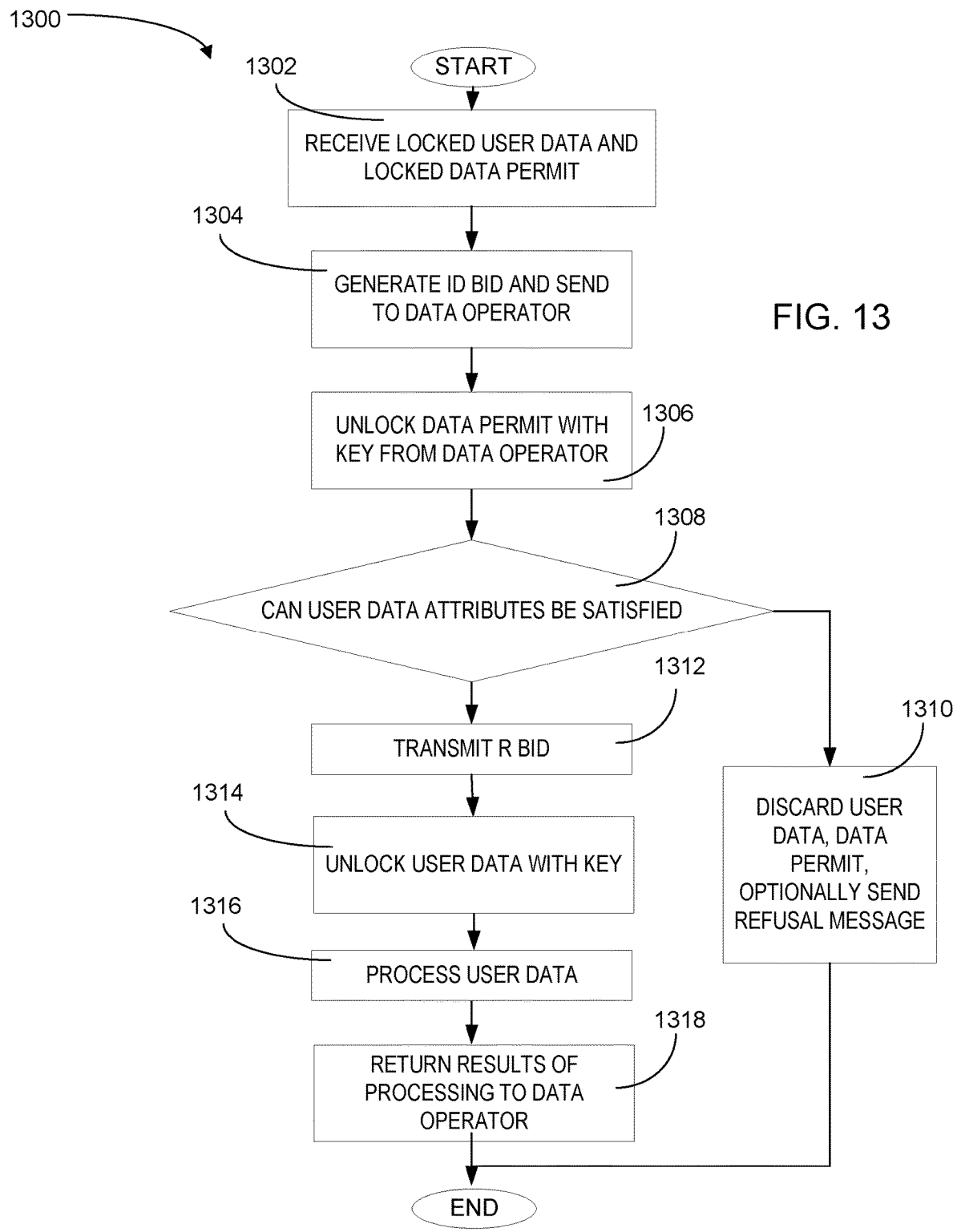
FIG. 13 is a flowchart representative of example machine readable instructions and/or example operations that may be executed by example processor circuitry to implement the data compute agent of FIGS. 1, 2, 3 and 6.

A flowchart representative of example hardware logic circuitry, machine readable instructions, hardware implemented state machines, and/or any combination thereof for implementing the user device 102 of FIGS. 1, 2 and 4 is shown in FIG. 7. Flowcharts representative of example hardware logic circuitry, machine readable instructions, hardware implemented state machines, and/or any combination thereof for implementing the example data operator 104 of FIGS. 1, 2, 3 and 5 are shown in FIGS. 8-11. Flowcharts representative of example hardware logic circuitry, machine readable instructions, hardware implemented state machines, and/or any combination thereof for implementing the data compute agents 106 of FIGS. 1, 2, 3 and 6 are shown in FIG. 12 and FIG. 13. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 7-13, many other methods of implementing the example user device 102, the example data operator 104 and/or the example data compute agent 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to enable communication from the example user device 102 (FIGS. 1, 2, and 4) to/with the example data operator 104 of FIGS. 1, 2, 3 and 5 in accordance with the example user data attribute-based data protection protocol of FIGS. 2 and 3. The machine readable instructions and/or the operations 700 of FIG. 7 begin at block 702, at which the example attribute agreement handler circuitry 406 (see FIG. 4) receives a request to share user data from the data operator 104. In some examples, in response to the request to share user data, and assuming the user opts to share user data, the attribute agreement handler circuitry 406 prompts the user to specify user data to be shared and user data attributes (at block 704). The attribute agreement handler circuitry 406 communicates responsive information provided by the user via the user device 102 (or via a user device registration kiosk located the premises of the data operator 104) to the data operator 104 (FIG. 1) and informs the user data attribute-based data protection circuitry 408 (see FIG. 4) of the selected user data attributes (at block 706).

The example user data collection circuitry 418 (see FIG. 4) of the example user data attribute-based data protection circuitry 408 begins to collect the data that the user has agreed to share (at block 708). In some examples, in response, the example token generator circuitry 416 of the user data attribute-based data protection circuitry 408 generates a proof of authenticity token (at block 710). In some examples, the encryption circuitry 410 (see FIG. 4) of the user device 102 encrypts the collected user data (and the user data attributes) based on a key produced by the key generator 414 and then signs the encrypted user data with the proof of authenticity token (at block 712). In some examples, the authenticity token is a cryptographic signature generated using a secret embedded in silicon of the user device 102. In some examples, the example secure communication circuitry 420 opens a secure communication channel with the example data operator 104 and transmits the encrypted and signed user data to the data operator 104 via the secure communication channel (at block 714). In some examples, the user data is communicated to the data operator 104 in batches, at a single time, or upon request by the data operator 104. In some examples, the user device 102 continues to send such user data in batches until such time as the user device 102 is no longer within a geographic region indicated by a location specified by a user data location attribute or until a timeframe specified by a user data timeframe attribute is expired, at which time the program ends.

Figure 8:
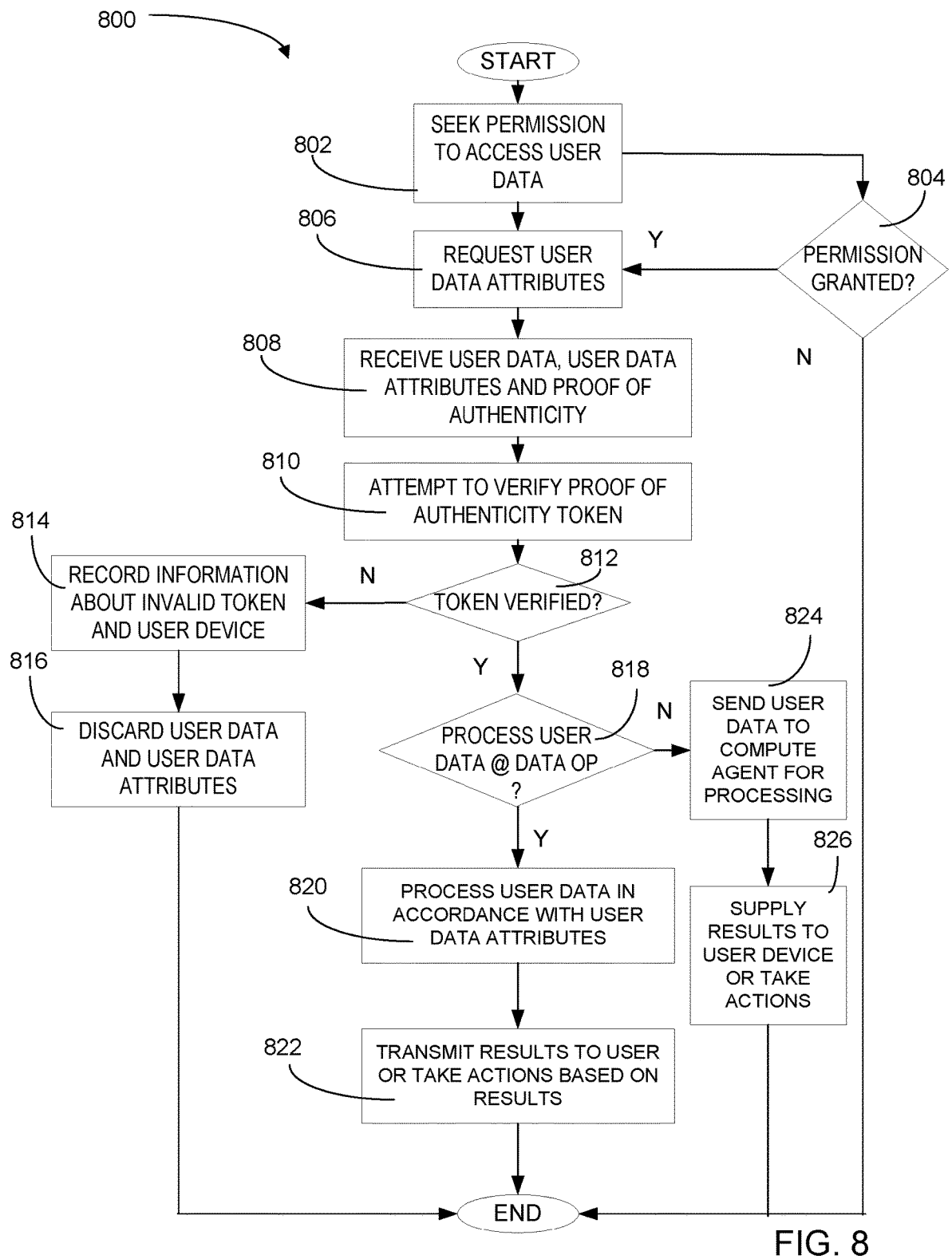
FIG. 8 is a flowchart representative of example machine readable instructions and/or example operations that may be executed by example processor circuitry to implement the data operator of FIGS. 1, 2, 3 and 5.

FIG. 8 is a flowchart representative of example machine readable instructions and/or example operations 800 that may be executed and/or instantiated by processor circuitry to enable communication from the example data operator 104 (FIGS. 1, 2, 3, and 5) to/with the example user device 102 of FIGS. 1, 2, and 4 in accordance with the example user data attribute-based data protection protocol of FIGS. 2 and 3. The machine readable instructions and/or the operations 800 of FIG. 8 begin at block 802, at which the example user-device engagement circuitry 502 of the example data operator 104 seeks permission to access user data on the user device 102. In some examples, the user-device engagement circuitry 502 determines, based on a response from the user device 102, whether the user has agreed to share user data (at block 804). In some examples, the user device 102 indicates that the user has denied the request in which case program ends.

In some examples, the example user-device engagement circuitry 502 determines the user has agreed to share user data (also at block 804) at which time, the user-device engagement circuitry 502 requests that the user device 102 transmit user data attributes with which to protect the user data to be shared (at block 806). In some examples, the example user data collection and packaging circuitry 518 of the example data operator 104 receives/accesses the user data and the user data attributes in an encrypted form (at block 808). In some examples, the user data and user data attributes are accompanied by a proof of authenticity token. In some examples, the user data and user data attributes are supplied in batches. In some examples, the example user data collection and packaging circuitry 518 accesses a secure communication channel established by the example secure communication circuitry 514 (see FIG. 5) to obtain and/or receive the user data/user data attributes and the proof of authenticity token. In some examples, the secure communication channel remains open so that, after the first user data batch having the user data attributes and the proof of authenticity token is received, future user data batches only include the user data.

In some examples, when received, the user data collection and packaging circuitry 518 causes the example proof of authenticity verification circuitry 515 to attempt to verify the proof of authenticity token (at block 810). In some examples, the proof of authenticity token verification circuitry 515 can use a public key to verify the proof of authenticity token. In some such examples, the proof of authenticity verification circuitry 515 uses the public key to verify the proof of authenticity token. If the proof of authenticity verification circuitry 515 determines that the token cannot be verified (at block 812), the proof of authenticity verification circuitry 515 notifies the user data collection and packaging circuitry 518. The user data collection and packaging circuitry 518 responds by recording information regarding the user device 102 that sent the invalid proof of authenticity token as well as information about the invalid proof of authenticity token (at block 814). In addition, the user data collection and packaging circuitry 518 discards the associated user data and user data attributes (at block 816). In some examples the recorded information can later be used to evaluate the trustworthiness of any future information received from the same user device 102. Thereafter, the program ends.

If the proof of authenticity token can be verified by the example proof of authenticity verification circuitry 515 (at block 812), the example user data collection and packaging circuitry 518 can determine, based on the user attributes, whether the data is to be processed at the data operator 104 or can be processed at any of the data compute agents (at block 818). For example, if the data operator 104 has the processing capacity and the attributes (e.g., time/location) of the data operator 104 satisfy the user data attributes, the user data collection and packaging circuitry 518 can determine that the data operator circuitry 104 is to process the user data. In some such examples, the user data collection and packaging circuitry 518 can cause the example user data processing circuitry 517 (see FIG. 5) to process the user data in accordance with the user data attributes (at block 820). Any results generated at the example user data processing circuitry 517 can be supplied back to the user device 102 if the user opted to receive the results back and/or the example user data results processor circuitry 519 may take any number of actions based on the data processing results (at block 822). Thereafter, the program ends.

In some examples, the example user data collection and packaging circuitry 518 may determine, based on the user data attributes, that the user data can be processed by a third party entity (e.g., one of the data compute agents). In some such examples, the user data collection and packaging circuitry 518 can package the user data and the user data attributes in a form that is appropriate for processing by a data compute agent and supply the packaged user data and user data attributes to a data compute agent 106 for processing (at block 824). Any results from the processing that are received back from the data compute agent 106 are supplied to the example user device 102 or are supplied to the example user data results processor 519. The user data results processor 519 uses the results to take any number of actions that are appropriate based on the user data (at block 826). Thereafter, the program ends.

Figure 9:
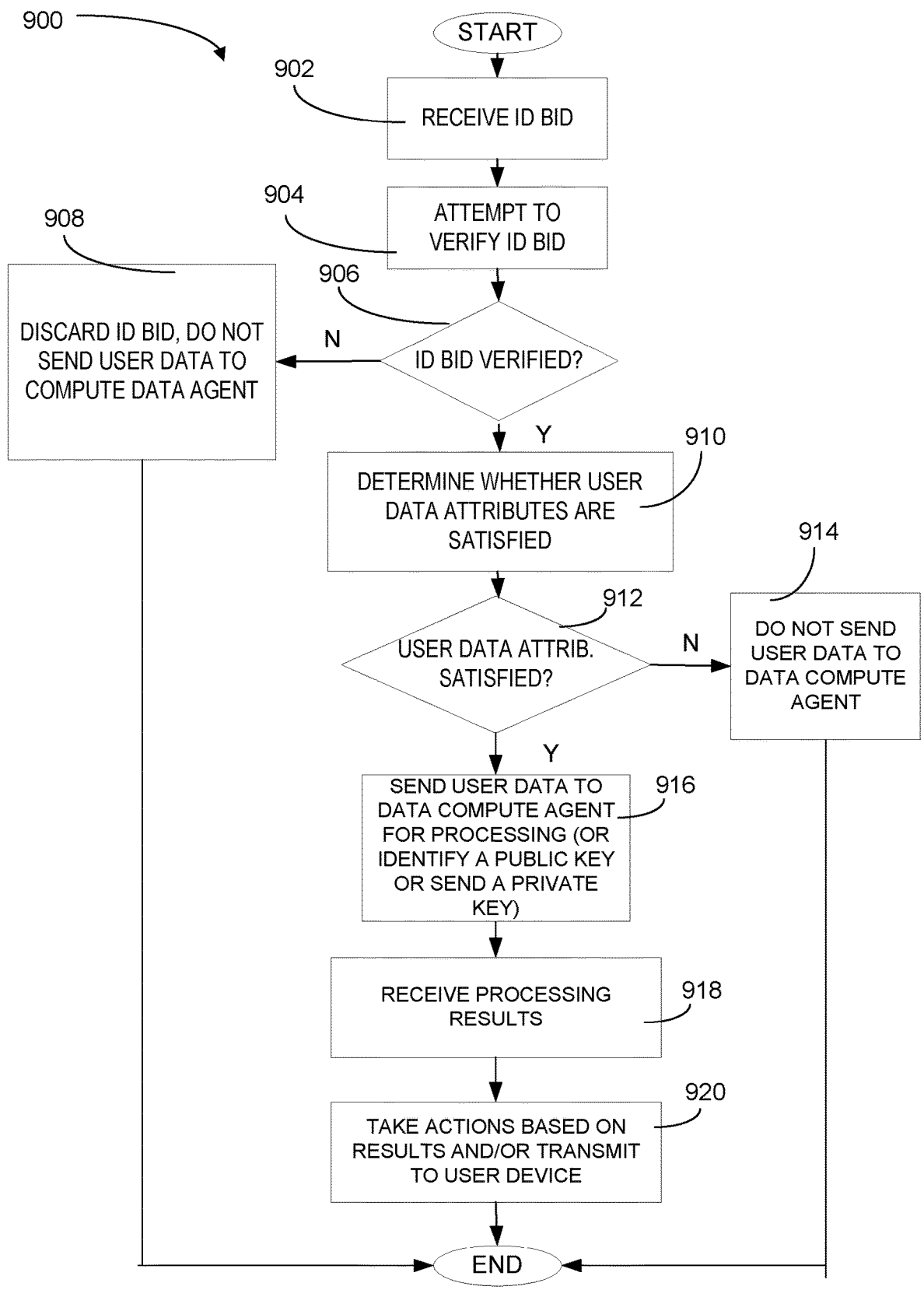
FIG. 9 is a flowchart representative of example machine readable instructions and/or example operations that may be executed by example processor circuitry to implement the data operator of FIGS. 1, 2, 3 and 5.

FIG. 9 is a flowchart representative of example machine readable instructions and/or example operations 900 that may be executed and/or instantiated by processor circuitry to enable communication from the example data operator 104 (FIGS. 1, 2, 3, and 5) to/with the example data compute agent 106 of FIGS. 1, 2, 3 and 6 in accordance with the example user data attribute-based data protection protocol of FIG. 2. The machine readable instructions and/or the operations 900 of FIG. 9 begin at block 902, when the example secure communications circuitry 514 of the data operator 104 receives an identity bid ("ID BID") from the example data compute agent 106. In some examples, the secure communication circuitry 514 supply the ID BID to the example identity bid and response bid verification circuitry 520 (see FIG. 5). The identity bid and response bid verification circuitry 520 of the data operator 104 attempts to verify that a cryptographic signature of the ID BID as described above in connection with FIG. 5 (at block 904). In some examples, when successfully verified, the identity bid is determined to have been generated by hardware and/or software of the data compute agent 106 that sent the ID BID and is determined to be trustworthy and, in some examples, configured to enforce the security policies (e.g., user data attributes) required by the user device 102 and/or the data operator 104. In some examples, the cryptographic signature of the ID BID is verified by the example trusted agent verification circuitry 528 (see FIG. 5). In some such examples, the cryptographic signature can indicate that the associated data compute agent 106 is under agreement to provide user data processing services and is, therefore, a "trusted agent." In some such examples, the trusted agent may not use tamper-proof hardware such that the example auditing circuitry 527 will be used to monitor/audit the behavior of the data compute agent for trustworthiness (or a lack thereof), as described above in connection with FIG. 5.

When the cryptographic signature of the ID BID cannot be successfully verified (as determined at block 906), the example access permit circuitry 524 (see FIG. 5) of the example data operator 104 will not provide user data to the data compute agent 106 for processing (at block 908), and the program ends.

When the cryptographic signature of the ID BID is successfully verified (as determined at block 906), the example attribute verification circuitry 522 (see FIG. 5) of the data operator 104 proceeds to determine whether the agent attributes included in the ID BID satisfy a set of user data attributes associated with the user data to be processed (at block 910). If the agent attributes do not satisfy the user data attributes of the user data to be processed (as determined at block 912), the data operator 104 does not send the user data to the data compute agent 106 and can, in some examples, send a message indicating that user data is not available for processing at that time (at block 914). If the agent attributes do satisfy the user data attributes, the user data collection and packaging circuitry 518 (see FIG. 5) of the data operator 104 prepares a data package/message having an encrypted data permit and corresponding encrypted user data and causes the data package/message to be transmitted to the data compute agent 106 for processing (at block 916). As described above, the data permit includes the user data attributes.

In some examples, the example data operator 104 transmitted the user data and data permit to the data compute agent before the ID BID was received (at block 902). In some such examples, when the user data attributes are determined to be satisfied by the example agent attributes, the example access permit circuitry 524 (see FIG. 5) of the data operator 104 can send information identifying a public key that the example data compute agent 106 can use to access (decrypt) the user data for processing (at block 916).

In response to sending the user results, the data operator 104 can receive processing results from the data compute agent 106 (at block 918). In some examples, the processing results are processed by the example user results processor circuitry 519 (at block 920). The example user results processor circuitry 519 can take any number of actions based on the results including transmitting the results to the user device 102. Thereafter, the program ends. In some examples, the program of FIG. 9 is repeated for each incoming ID BID.

Figure 10:
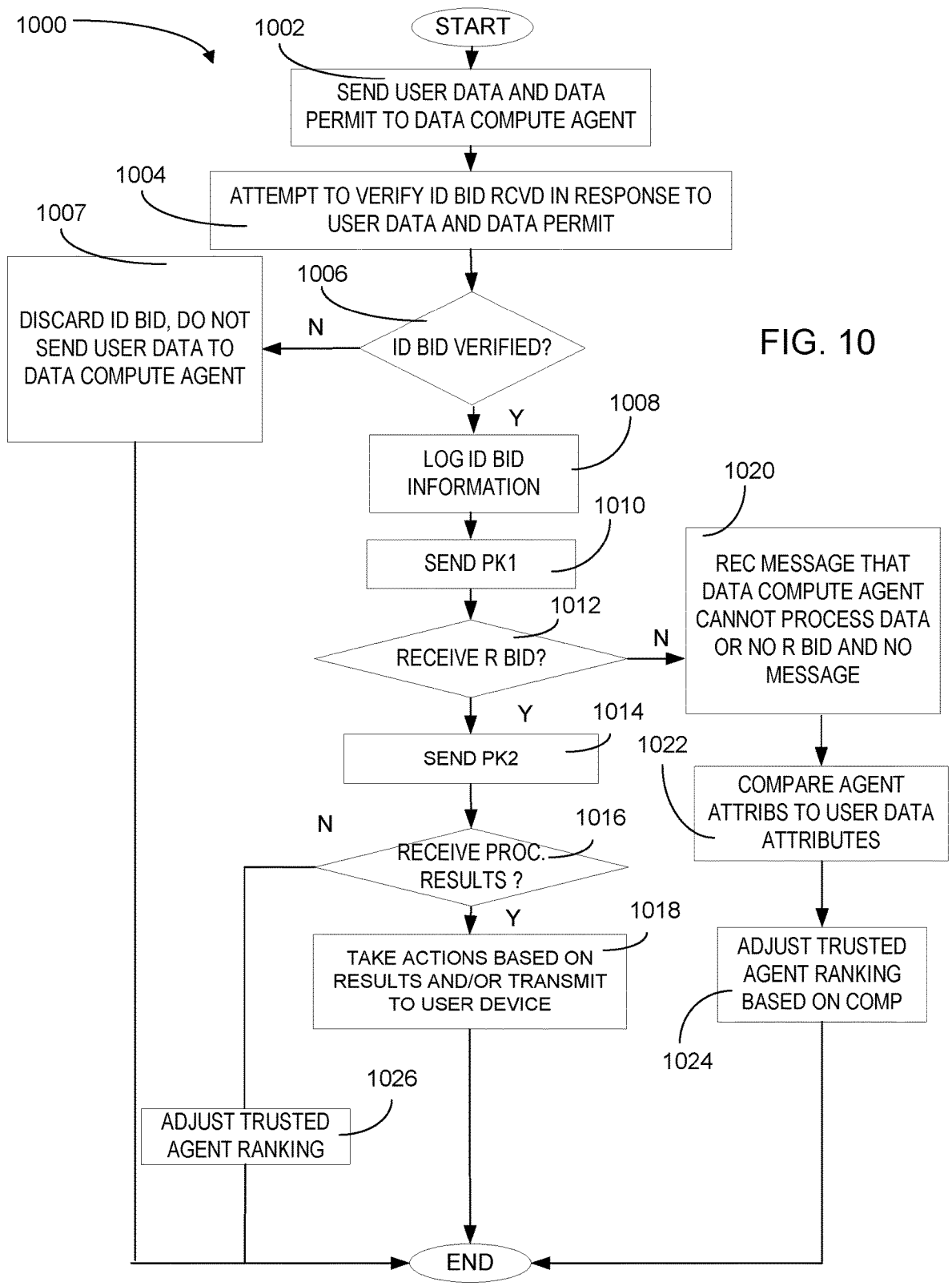
FIG. 10 is a flowchart representative of example machine readable instructions and/or example operations that may be executed by example processor circuitry to implement the data operator of FIGS. 1, 2, 3 and 5.

FIG. 10 is a flowchart representative of example machine readable instructions and/or example operations 1000 that may be executed and/or instantiated by processor circuitry to enable communication from the example data operator 104 (FIGS. 1, 2, 3, and 5) to/with the example data compute agent 106 of FIGS. 1, 2, 3 and 6 in accordance with the example user data attribute-based data protection protocol of FIG. 3. The machine readable instructions and/or the operations 1000 of FIG. 10 begin at block 1002, at which the data operator 104 provides the user data and the user data attributes (as a data permit) to the data compute agent 106. As described above with reference to FIG. 3, the data permit and the user data are provided to the data compute agent 106 in locked (encrypted) state (e.g., with a LOCK 2 and a LOCK 1, respectively).

In some examples, the example identity bid and response bid verification circuitry 520 (FIG. 5) of the example data operator 104 (FIGS. 1, 2, 3, and 5) attempts to verify an authentication token of an ID BID received from the data compute agent 106 (at block 1004) in response to the transmission of the user data and data permit at block 1002. If the ID BID cannot be verified (as determined at block 1006), the data operator 104 discards the ID BID, and does not send user data to the data compute agent (at block 1007). Thereafter, the program ends.

If the ID BID can be verified (as determined at block 1006), the data operator 104 records the agent attributes and any additional information included in the ID BID (at block 1008). In some examples, after the example data operator 104 has recorded the agent attributes and any additional information included in the ID BID have been recorded, the example data operator 104 transmits a first key, PK1, to the data compute agent 106 for use in unlocking LOCK 1 of the data permit (at block 1010). In some examples, the identity bid and responsive bid verification circuitry 520 of the data operator 104 then determines whether an R BID has been received in response to the transmission of PK1 (block 1012). If an R BID is received, the example access permit circuitry 524 (see FIG. 5) of the data operator 104 sends/transmits the second key, PK2, to the data compute agent 106 for use in accessing (unlocking) LOCK 2 of the user data (at block 1014).

Next, the example data operator 104 determines whether results of the processing of the user data have been received from the data compute agent 106 (at block 1016). If the results have been received, the example user data results processing circuitry 519 (see FIG. 5) of the data operator 104 takes actions based on the results and/or causes the results to be transmitted to the user device 102 (at block 1018). Thereafter, the program ends. In some examples, the program of FIG. 10 continues to repeat to process additional ID BIDs for the processing of additional sets/batches of user data.

In some examples, after the transmission of PK1, the data operator 104 does not receive an R BID (as determined at block 1012) but instead receives a message from the data compute agent 106 indicating that the user data cannot be processed (at block 1020). (Such a message may be transmitted by the data compute agent when, for example, after using PK1 to unlock the user data attributes, the data compute agent 106 determines that it cannot satisfy the user data attributes.) In some examples, the example attribute verification circuitry 522 (see FIG. 5) of the example data operator 104 responds to the message by comparing the agent attributes recorded (at block 1008) to the user data attributes of the data permit (at block 1022).

The example trusted agent ranking circuitry 528 (see FIG. 5) of the example data operator 104 then adjusts the trusted agent ranking of the corresponding data compute agent (at block 1024) based on the comparison. For example, when the comparison at block 1022 indicates that the agent attributes obtained from the ID BID do satisfy the user attributes of the data permit, the data operator 104 can cause a trusted agent ranking corresponding to the data compute agent to be adjusted for the worse because either the data compute agent was putting forth false information in the ID BID or in the message indicating that the user data cannot be processed. In some such examples, the amount by which the trusted agent ranking is adjusted for the worse can be offset by the fact that the data compute agent 106 came clean about its ability to satisfy the user data attributes before sending an R BID.

In some examples, the comparison at the block 1022 indicates that the agent attributes obtained from the ID BID do not satisfy the user attributes of the data permit. In some such examples, the trusted agent ranking circuitry 528 of the data operator 104 can adjust the trusted agent ranking of the example data compute agent (at block 1024) for the better because the message indicating that the user data cannot be processed appears to be true.

In some examples, the data operator 104 determines the processing results have not been received in response to transmission of the key, PK2 (as determined at block 1016). In some examples, when processing results are not received but PK2 has been transmitted, the example trusted agent ranking circuitry 528 of the data operator 104 adjusts the trusted agent ranking for the worse (at block 1026), because the data compute agent sent an R BID indicating that it could satisfy the user data attributes, but the lack of results, means that the data compute agent misrepresented its capabilities. In some examples, the amount of the adjustment for the worse can be offset by the fact that the data compute agent did not supply results based on processing of the user data performed outside of the boundaries of the data protection protocol.

In any event, the direction and amount of adjustment of the trusted agent ranking is at the discretion of personnel that control any algorithms that govern the operation of the data operator 104. After the trusted agent ranking is adjusted at blocks 1024 and 1026, the program ends.

Figure 11:
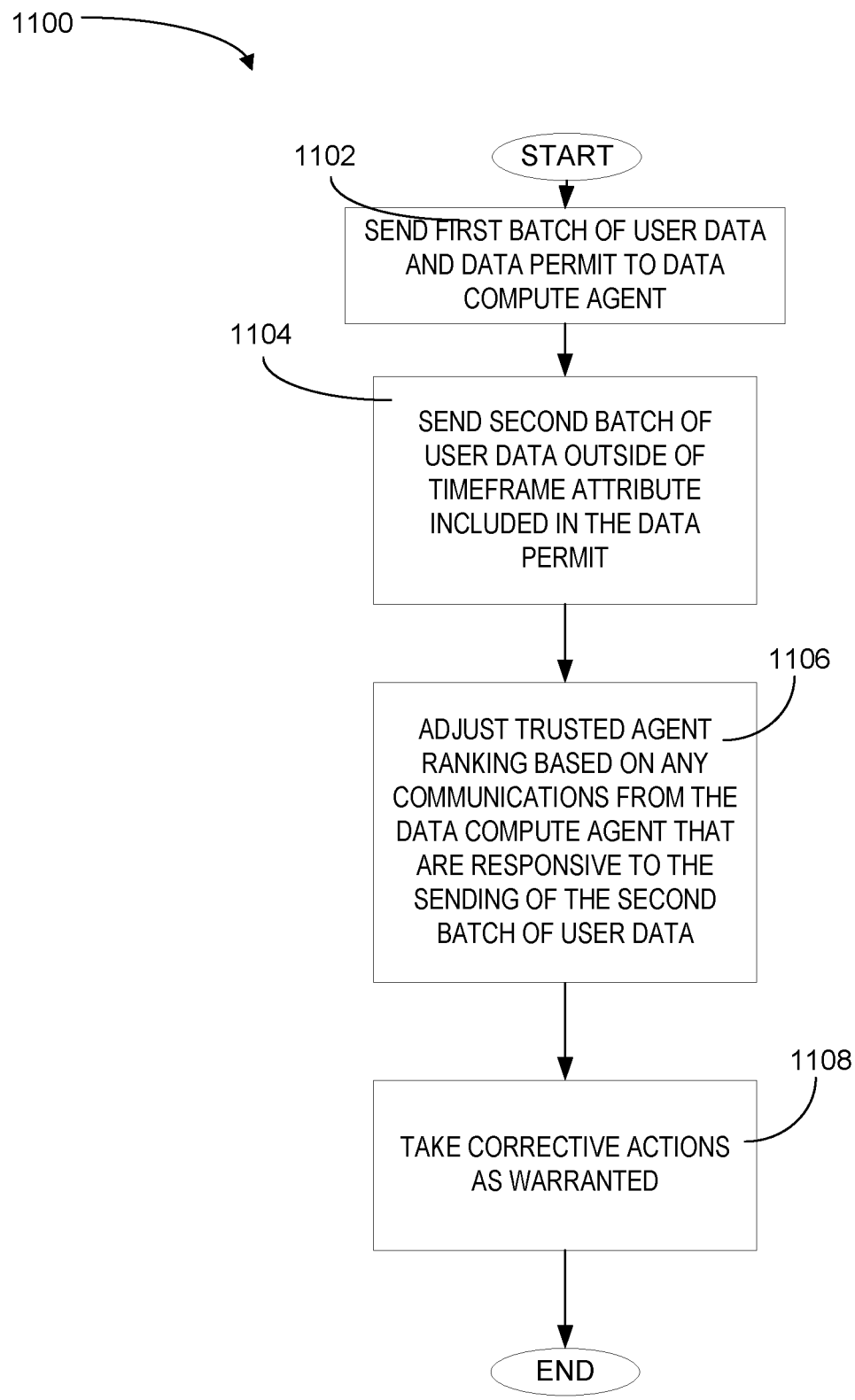
FIG. 11 is a flowchart representative of example machine readable instructions and/or example operations that may be executed by example processor circuitry to implement the data operator of FIGS. 1, 2, 3 and 5.

FIG. 11 is a flowchart representative of example machine readable instructions and/or example operations 1100 that may be executed and/or instantiated by processor circuitry to enable communication from the example data operator 104 (FIGS. 1, 2, 3, and 5) to/with the example data compute agent 106 of FIGS. 1, 2, 3 and 6 in accordance with the example user data attribute-based data protection protocol of FIG. 3. The machine readable instructions and/or the operations 1100 of FIG. 11 can be used to audit compliance with the user data attribute-based data protection protocol disclosed herein by the data compute agent 106. Although, for the sake of brevity, the machine readable instructions and/or the operations 1100 of FIG. 11 do not reiterate the blocks that are described in FIG. 10, one or more of the blocks of FIG. 10 are assumed to be performed in addition to the blocks of FIG. 11, as would be appropriate based on the descriptions of the auditing feature of the user data attribute-based data protection protocol provided herein (refer to the description of FIG. 3).

In some examples, the example user data collection and packaging circuitry 518 of the example data operator 104 sends a data permit with a first batch of user data and the data permit includes a timeframe attribute that identifies a timeframe within which the user data is to be processed by the data compute agent 106 (at block 1102). In some such examples, the data permit can be locked with LOCK1 (based on PK1) and the first batch of user data can be locked with LOCK2 (based on PK2). In some examples, the example encryption/decryption circuitry 516 of FIG. 5 is used to place the locks on the user data and data permit. In some examples, the data operator transmitted the keys PK1 and PK2 for use in unlocking LOCK1 and LOCK2 as described in connection with blocks of FIG. 10. Thereafter, the user data collection and packaging circuitry 518 sends a second user data batch with the same data permit but the second user data batch and the same data permit are sent by the data operator 104 outside of the timeframe included in the data permit (at block 1104). The second user data batch can be locked with a third key, "PK3," and can include, for example, bogus data.

The example trusted agent verification circuitry 526 of the example data operator 104 then updates a trusted agent ranking of the data compute agent 106 based on a response to the second user data batch, if any, that is received from the data compute agent 106 (at block 1106). In some examples, responsive to the transmission of the second user data batch, the data compute agent 106 refuses to process the user data (because it was sent outside of the timeframe attribute in the data permit). For example, the data compute agent 106 can communicate this refusal by not sending an R BID or by sending a message indicating that the second batch of user data was transmitted outside of the user data timeframe attribute and cannot, therefore, be processed. Thus, if the trusted agent verification circuitry 526 of the data operator 104 receives a refusal from the data compute agent 106 or receives no response at all, the trusted agent verification circuitry 526 can update the trusted agent ranking corresponding to the data compute agent 106 based on the refusal.

In such examples, the trusted agent ranking for the data compute agent 106 will improve.

If the example trusted agent verification circuitry 526 of the data operator 104 receives an R BID from the data compute agent 106 indicating that the data compute agent 106 will process the user data, the trusted agent verification circuitry 526 can update the trusted agent ranking. In such an instance, the trusted agent ranking will worsen to thereby indicate that the trustworthiness of the data compute agent 106 has decreased.

Additionally, based on any response from the data compute agent, the trusted agent verification circuitry 526 and/or the user data results processor circuitry 519 of the data operator 104 can take any corrective action deemed appropriate (at block 1108). Such corrective action can include: not sending a key to unlock the second user data batch, sending a message indicating that the data compute agent 106 is not trustworthy, sending a message that the agreement is terminated, sending a message that the data compute agent 106 will not be receiving further data batches for processing, sending a message that includes a warning that further deceit will result in termination of the agreement, and/or sending other message content that the data operator 104 deems appropriate. Thereafter the program of FIG. 11 ends.

In some examples, the program of FIG. 11 can be modified to audit for geographical location non-compliance. In some such examples, the example data operator 104 sends the first data permit with a first batch of user data to be processed by the data compute agent 106 (also at block 1102). In some such examples, the first data permit can be locked with PK1 and the first batch of user data can be locked with PK2 and the data compute agent obtains PK1 and PK2 according to one or more of the corresponding blocks of FIG. 10. Thereafter, the data operator 104 can send a second user data batch with a second data permit (at block 1104). The second user data batch can be locked with a third key, "PK3," and can include, for example, bogus data. The second user data batch can also be sent with a second data permit that can also be locked with the LOCK1. However, in this example, the second data permit includes user data attributes that conflict with the user data attributes included in the first data permit. In some examples, the user data attributes of the second data permit can include a geographical location that is different from a geographical location that is included in the user data attributes of the first data permit and the two different geographical locations do not overlap.

In some examples, when the data compute agent 106 responds to the second user data batch with an R BID that indicates that the data compute agent 106 can process the second user data batch, the data operator 104 uses this information to update the trusted agent ranking (at block 1106). In this instance, the data operator 104 changes the trusted agent ranking for the worse to indicate that the data compute agent 106 is not trustworthy (or is less trustworthy than previously judged). If, instead, the data compute agent 106 responds to the receipt of the second user data batch with a refusal to process the second user data batch, the data operator 104 changes the trusted agent ranking for the better to indicate that the data compute agent 106 is behaving in a trustworthy manner. As described above, the program terminates after block 1108.

FIG. 12 is a flowchart representative of example machine readable instructions and/or example operations 1100 that may be executed and/or instantiated by processor circuitry to enable communication from the example data compute agent 106 (FIGS. 1, 2, 3, and 6) to/with the example data operator 104 of FIGS. 1, 2, 3 and 5 in accordance with the example user data attribute-based data protection protocol of FIG. 2. In some examples, when the data compute agent 106 is ready to process user data (under a data operator/data compute agent agreement), the example identity bid and response bid generation circuitry 618 of the example data compute agent 106 causes the encryption circuitry to encrypt a set of agent attributes (at block 1202). The example cryptographic signature generator circuitry 615 of the example data compute agent 106 then generates an authentication token (at block 1204). As described above in connection with FIG. 6, the authentication token is generated based on a secret embedded/burnt into the silicon/hardware componentry circuitry of the data compute agent 106. The identity bid and response bid generation circuitry 618 causes the encrypted agent attributes to be signed with the authentication token to thereby generate an ID BID (at block 1206). Responsive to transmitting the ID BID, the data compute agent 106 receives user data and a corresponding data permit and causes the example decryption circuitry 622 to decrypt the user data and the data permit (at block 1208). In some examples, the example data permit analyzer circuitry 620 analyzes the user data attributes to determine whether agent attributes of the data compute agent 106 satisfy the user data attributes. If so, the example user data processing circuitry 626 (FIG. 6) processes the user data in accordance with the data permit (at block 1210). The user data processing circuitry 626 then causes the example secure communication circuitry 614 (see FIG. 6) to transmit the processing results to the data operator 104 (at the block 1212). Thereafter the program ends.

FIG. 13 is a flowchart representative of example machine readable instructions and/or example operations 1100 that may be executed and/or instantiated by processor circuitry to enable communication from the example data compute agent 106 (FIGS. 1, 2, 3, and 6) to/with the example data operator 104 of FIGS. 1, 2, 3 and 5 in accordance with the example user data attribute-based data protection protocol of FIG. 3. In some examples, the program starts at a block 1302, at which the data compute agent 106 receives the user data and the user data attributes from the data operator 104. In some examples, the data permit is locked with a first lock, "LOCK 1," and the user data is locked with a second lock, "LOCK 2." The data compute agent 106, lacking a first key PK1 and a second key PK2, is not able to access either the user data permit information or the user data upon receipt.

In some examples, responsive to receipt of the locked data permit and the locked user data, the example identity bid and response bid generation circuitry 618 (see FIG. 6) generates an identity bid ("ID BID") and causes the example secure communication circuitry 614 to transmit the identity ID BID to the data operator 104 (at block 1304). Generation of the ID BID is represented also, by blocks 1202, 1204, and 1206 of FIG. 12.

The example decryption circuitry 622 of the example data compute agent 106 uses a first key, PK1, received from the data operator 104 to unlock the data permit and thereby gain access to the user data attributes and any additional information included in the data permit (at block 1306). The example data permit analyzer circuitry 620 of the data compute agent 106 then determines whether it can satisfy the user data attributes (at block 1308). In some such examples, determining whether the data compute agent 106 can satisfy the user data attributes includes the data compute agent 106 comparing its own agent attributes to the user data attributes included in the permit. If the comparison indicates that the agent attributes do not satisfy the user data attributes, then the data compute agent 106 discards both the data permit and the locked user data and does not have further correspondence with the data operator 104 regarding that user data (at block 1310). In some examples, the data compute agent 106 also sends a message indicating that it cannot process the user data for failure to satisfy the user data attributes.

In some examples, if the comparison indicates that the agent attributes do satisfy the user data attributes, then the data access permit analyzer circuitry 620 notifies the example identity bid and response bid generation circuitry 618 which responds to the notification by generating a positive response bid ("R BID") (see encircled number 7B) and causing the R BID to be sent to the example data operator 104 (at block 1312).

In some examples, the example decryption circuitry 622 (see FIG. 6) of the data compute agent 106 uses a second key, PK2, received from the data operator 104 to unlock the user data (at block 1314) and then the example user data processing circuitry 626 (see FIG. 6) processes the user data accordance with the user data attributes (at block 1316). When the data compute agent 106 has finished processing the user data, the data compute agent 106 supplies the results of the processing to the example data operator 104 which uses the results in accordance with any user data attributes and/or supplies information (which may include, but need not include, the results) to the user device 102 (at block 1318). Thereafter, the program ends.

Figure 14:
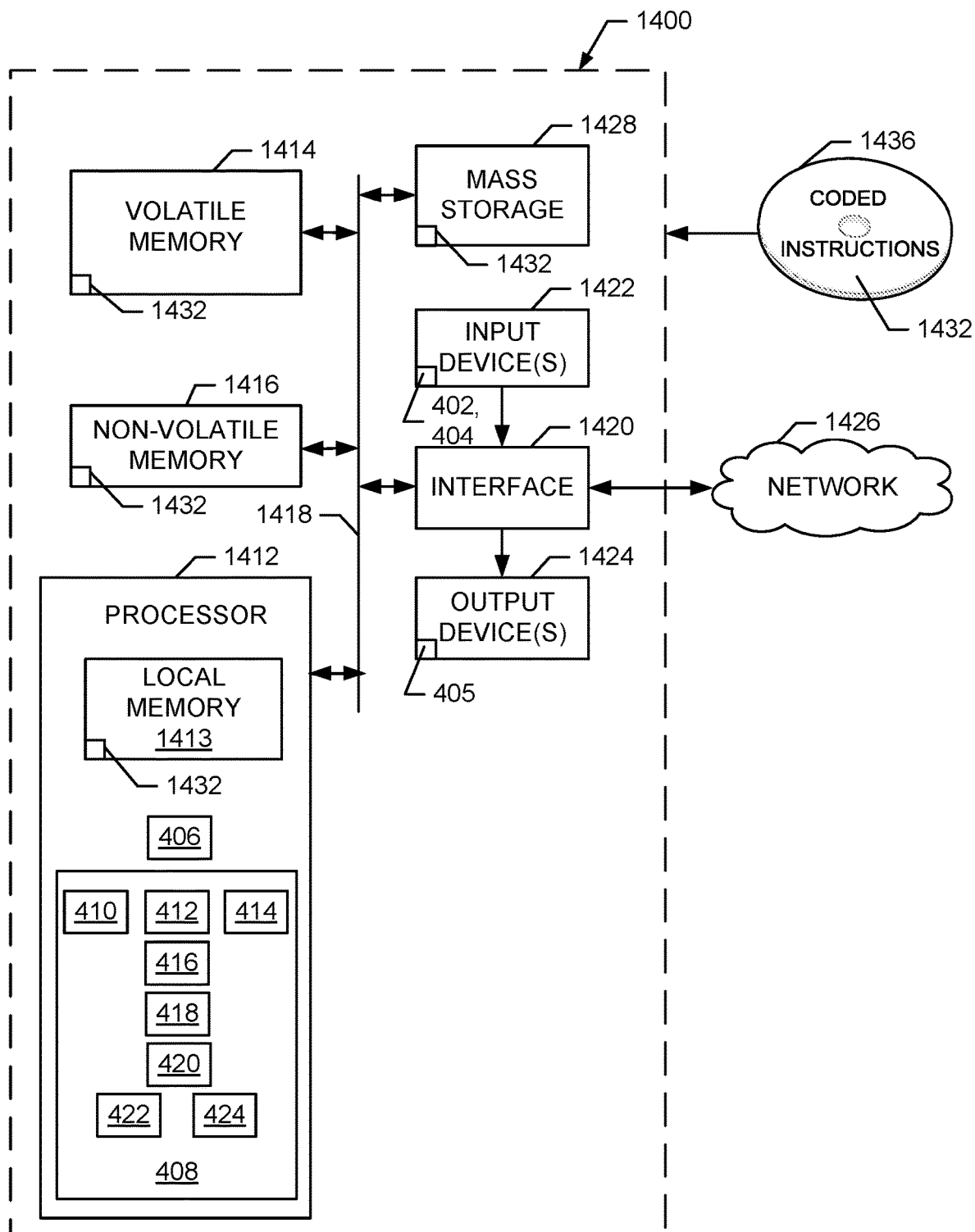
FIG. 14 is a block diagram of an example processing platform including processor circuitry structured to execute the example machine readable instructions and/or the example operations of FIG. 7 to implement the user device of FIGS. 1, 2, and 4.

FIG. 14 is a block diagram of an example processor platform 1400 structured to execute and/or instantiate the machine readable instructions and/or the operations of FIG. 7 to implement the example user device 102 of FIG. 4. The processor platform 1400 can be, for example, a mobile device (e.g., a cell phone, a smart phone, a tablet such as an iPad™), a personal digital assistant (PDA), a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs, microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example attribute agreement handler circuitry 406, the example user data attribute-based data protection circuitry 408, the example encryption circuitry 410, the example decryption circuitry 412, the example key generator 414, the example token generator circuitry 416, the example user data collection circuitry 418, the example secure communication circuitry 420, the example trusted time source circuitry 422, and/or the example global positioning system circuitry 424.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory

1414, 1416 of the illustrated example is controlled by a memory controller 1417. In some examples, the main memory 1414, 1416 can be used to implement the example storage device(s) 426.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1422 are arranged or otherwise configured to allow the user to control the processor platform 1400 and provide data to the processor platform 1400 using physical gestures, such as, but not limited to, hand or body movements, facial expressions, face recognition, etc. In some examples, the input device(s) 1422 implement the example data sensors 404 and/or the example input devices 404.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU. In some examples, the output device(s) 1424 implement the example output devices 405.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1432, which may be implemented by the machine readable instructions of FIG. 7, may be stored in the mass storage device 1428, in the volatile memory 1414, in the non-volatile memory 1416, and/or on a removable non-transitory computer readable storage medium such as a CD or DVD.

Figure 15:
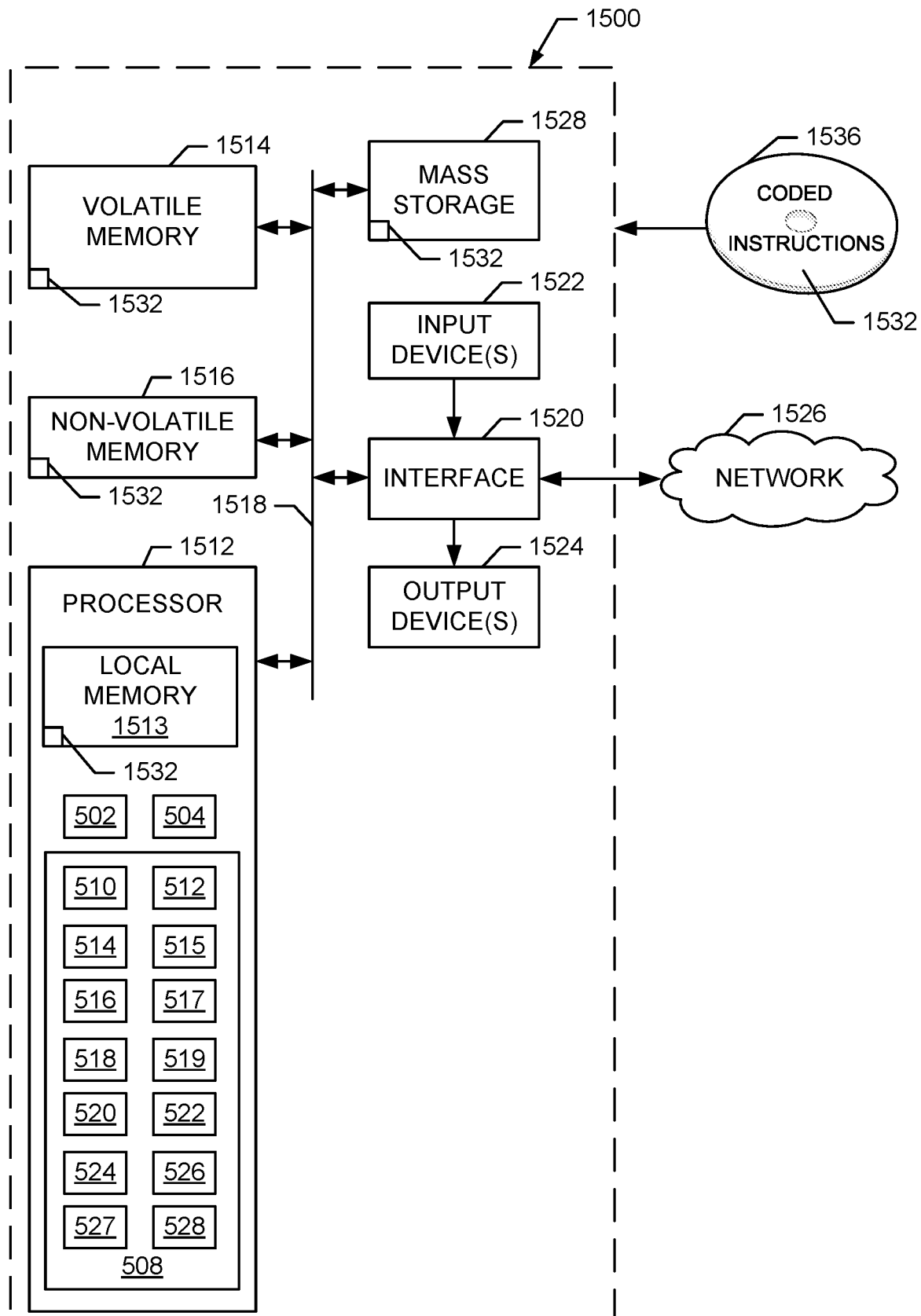
FIG. 15 is a block diagram of an example processing platform including processor circuitry structured to execute the example machine readable instructions and/or the example operations of FIGS. 8-11 to implement the data operator 104 of FIGS. 1, 2, 3 and 5.

FIG. 15 is a block diagram of an example processor platform 1500 structured to execute and/or instantiate the machine readable instructions and/or the operations of FIGS. 8-11 to implement the example data operator 104 of FIG. 5. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1500 of the illustrated example includes processor circuitry 1512. The processor circuitry 1512 of the illustrated example is hardware. For example, the processor circuitry 1512 can be implemented by one or more integrated circuits, logic circuits, FPGAs, microprocessors, CPUs, GPUs, DSPs, and/or microcontrollers from any desired family or manufacturer. The processor circuitry 1512 may be implemented by one or more semiconductor based (e.g., silicon based) devices. In this example, the processor circuitry 1512 implements the example user device engagement circuitry 502, the example data computer agent agreement negotiator circuitry 504, the example operator user data attribute-based data protection circuitry 508, the example trusted time source, the example GPS circuitry 512, the example secure communication circuitry 514, the example proof of authenticity verification circuitry 515, the example encryption/decryption circuitry 516, the example user data processing circuitry 517, the example user data collector circuitry 518, the example user data results processor circuitry 519, the example identity bid and response bid verification circuitry 520, the example attribute verification circuitry 522, the example access permit circuitry 524, the example trusted agent verification circuitry 526, the example auditing circuitry 527, and/or the example trusted agent ranking circuitry 528.

The processor circuitry 1512 of the illustrated example includes a local memory 1513 (e.g., a cache, registers, etc.). The processor circuitry 1512 of the illustrated example is in communication with a main memory including a volatile memory 1514 and a non-volatile memory 1516 by a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1516 may be implemented by flash memory and/or any other desired type of memory device. Access to the main memory 1514, 1516 of the illustrated example is controlled by a memory controller 1517. In some examples, one or more of the memories of FIG. 15 can be used to implement the example one or more example storage device(s) 530 (of FIG. 5).

The processor platform 1500 of the illustrated example also includes interface circuitry 1520. The interface circuitry 1520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1522 are connected to the interface circuitry 1520. The input device(s) 1522 permit(s) a user to enter data and/or commands into the processor circuitry 1512. The input device(s) 1522 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1522 are arranged or otherwise configured to allow the user to control the processor platform 1500 and provide data to the processor platform 1500 using physical gestures, such as, but not limited to, hand or body movements, facial expressions, face recognition, etc.

One or more output devices 1524 are also connected to the interface circuitry 1520 of the illustrated example. The output device(s) 1524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1520 of the illustrated example, thus, typically includes a graphics driver card, a graphics driver chip, and/or graphics processor circuitry such as a GPU.

The interface circuitry 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1500 of the illustrated example also includes one or more mass storage devices 1528 to store software and/or data. Examples of such mass storage devices 1528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1532, which may be implemented by the machine readable instructions of FIGS. 8-11, may be stored in the mass storage device 1528, in the volatile memory 1514, in the non-volatile memory 1516, and/or on a removable non-transitory computer readable storage medium such as a CD or DVD.

Figure 16:
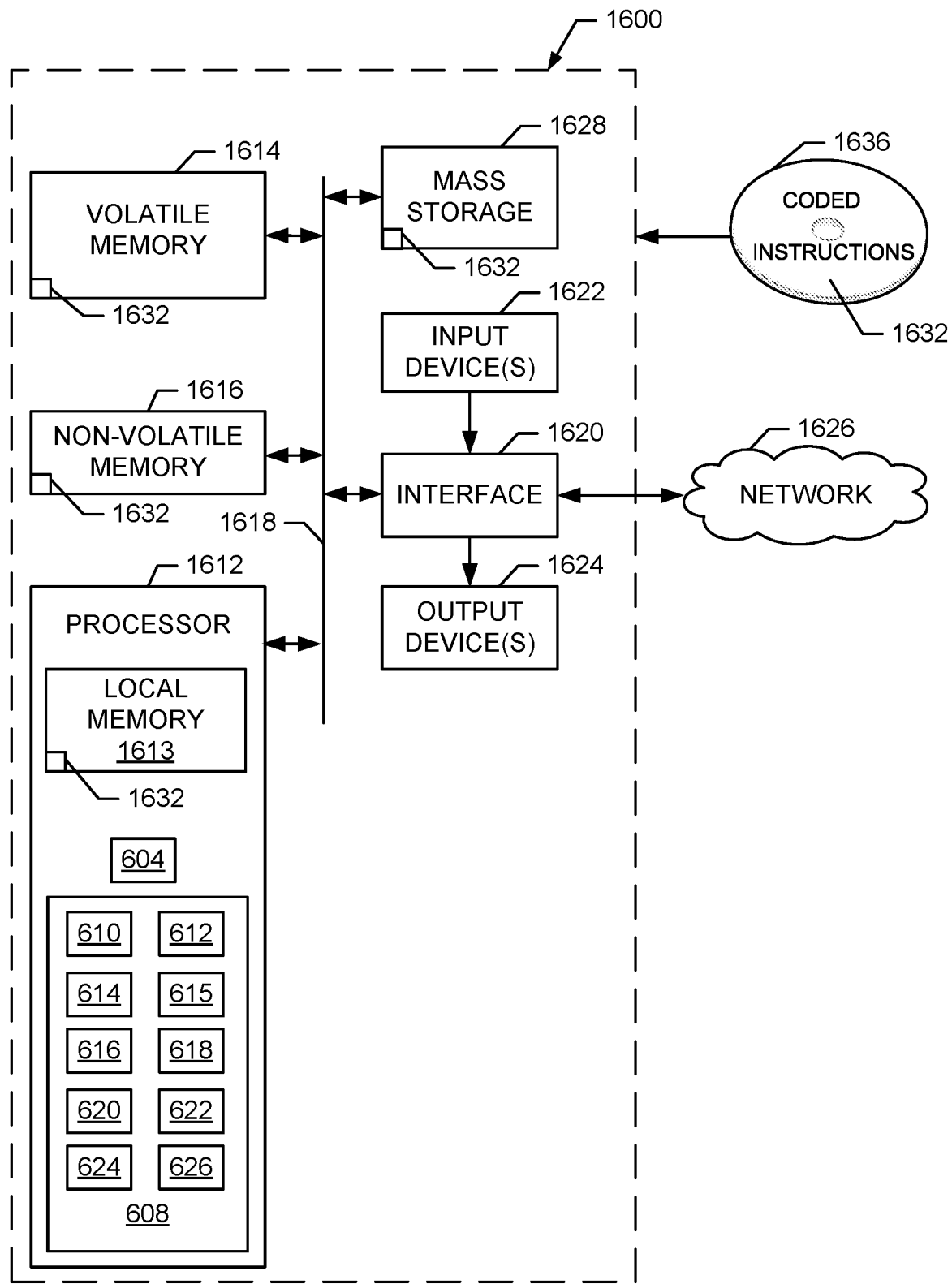
FIG. 16 is a block diagram of an example processing platform including processor circuitry structured to execute the example machine readable instructions and/or the example operations of FIG. 12 and FIG. 13 to implement the data compute agent(s) of FIGS. 1, 2, 3, and 6.

FIG. 16 is a block diagram of an example processor platform 1600 structured to execute and/or instantiate the machine readable instructions and/or the operations of FIGS. 12 and 13 to implement the example data compute agent circuitry 106 of FIG. 6. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the example data operator 104 agreement negotiator circuitry 604, the example data compute agent attribute-based data protector circuitry 608, the example trusted time source 610, the example GPS circuitry 612, the example secure communication circuitry 614, the example cryptographic signature generator 615, the example encryption circuitry 616, the example identity bid and response bid generation circuitry 618, the example data permit analyzer circuitry 620, the example decryption circuitry 622, the example user device verification circuitry 624, and/or the example user data processing circuitry 626.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617. In some examples, one or more of the memories of FIG. 16 can be used to implement the one or more example storage devices 628 of FIG. 6.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, a trackbar, an isopoint device, a voice recognition system and/or any other human-machine interface. In some examples, the input device(s) 1622 are arranged or otherwise configured to allow the user to control the processor platform 1600 and provide data to the processor platform 1600 using physical gestures, such as, but not limited to, hand or body movements, facial expressions, face recognition, etc.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1632, which may be implemented by the machine readable instructions of FIGS. 12 and 13, may be stored in the mass storage device 1628, in the volatile memory 1614, in the non-volatile memory 1616, and/or on a removable non-transitory computer readable storage medium such as a CD or DVD.

Figure 17:
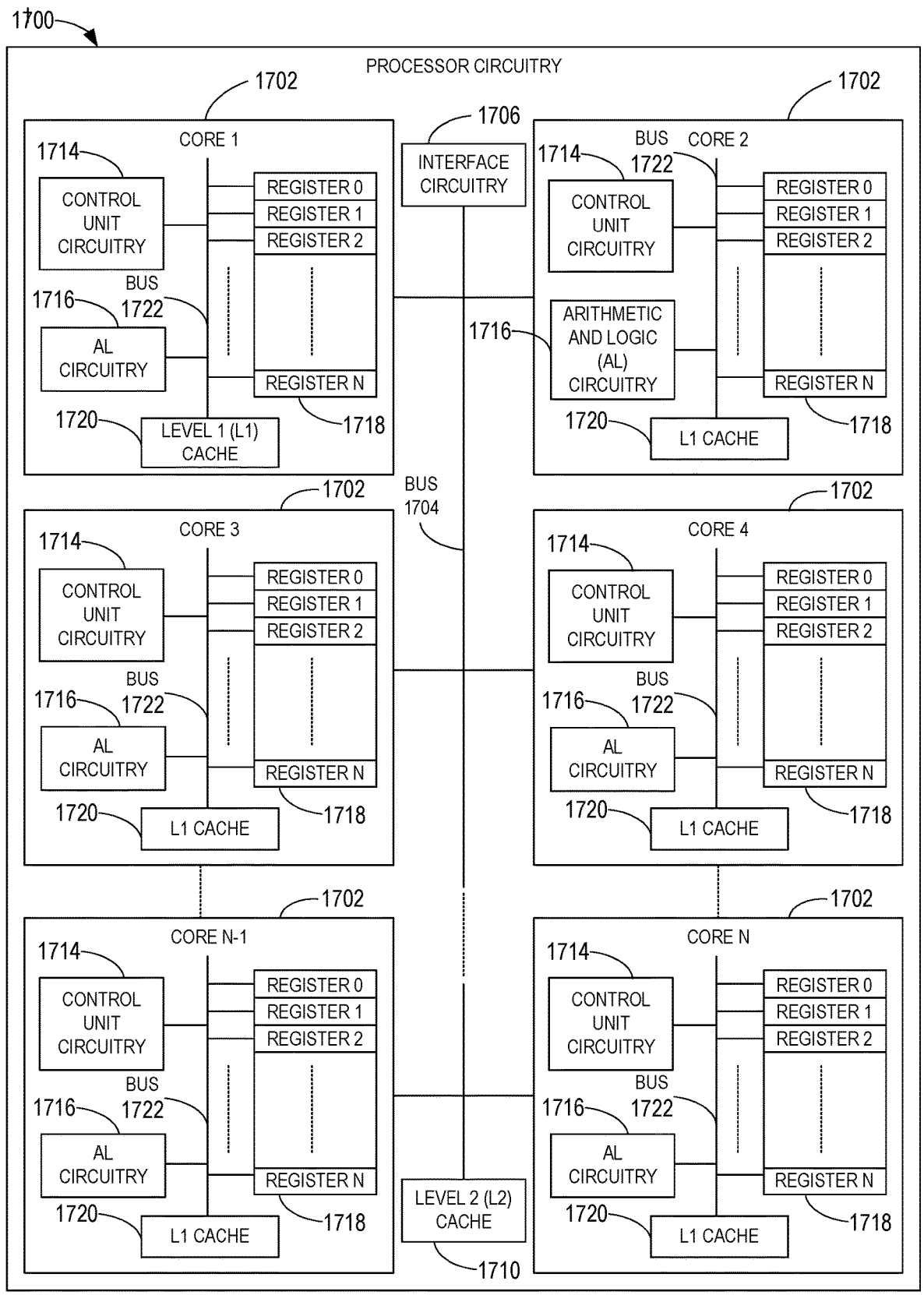
FIG. 17 is a block diagram of an example implementation of the processor circuitry of FIGS. 14-16.

FIG. 17 is a block diagram of an example implementation of the processor circuitry 1412, 1512 and/or 1612 of FIGS. 14-16. In this example, the processor circuitry 1412, 1512 and/or 1612 of FIGS. 14-16 is implemented by a general purpose microprocessor 1700. The general purpose microprocessor circuitry 1700 executes some or all of the machine readable instructions of the flowcharts of FIGS. 7-13 to effectively instantiate the circuitry of FIGS. 4, 5 and/or 6 as logic circuits to perform the operations corresponding to those machine readable instructions. In some such examples, the circuitry of FIGS. 4, 5 and/or 6 is instantiated by the hardware circuits of the microprocessor 1700 in combination with the instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowchart of FIG. _.

The cores 1702 may communicate by a first example bus 1704. In some examples, the first bus 1704 may implement a communication bus to effectuate communication associated with one(s) of the cores 1702. For example, the first bus 1704 may implement at least one of an Inter-Integrated Circuit (I2C) bus, a Serial Peripheral Interface (SPI) bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1414, 1416, 1514, 1516, 1614 and/or 1616 of FIGS. 14-16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may implement at least one of an I2C bus, a SPI bus, a PCI bus, or a PCIe bus.

Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
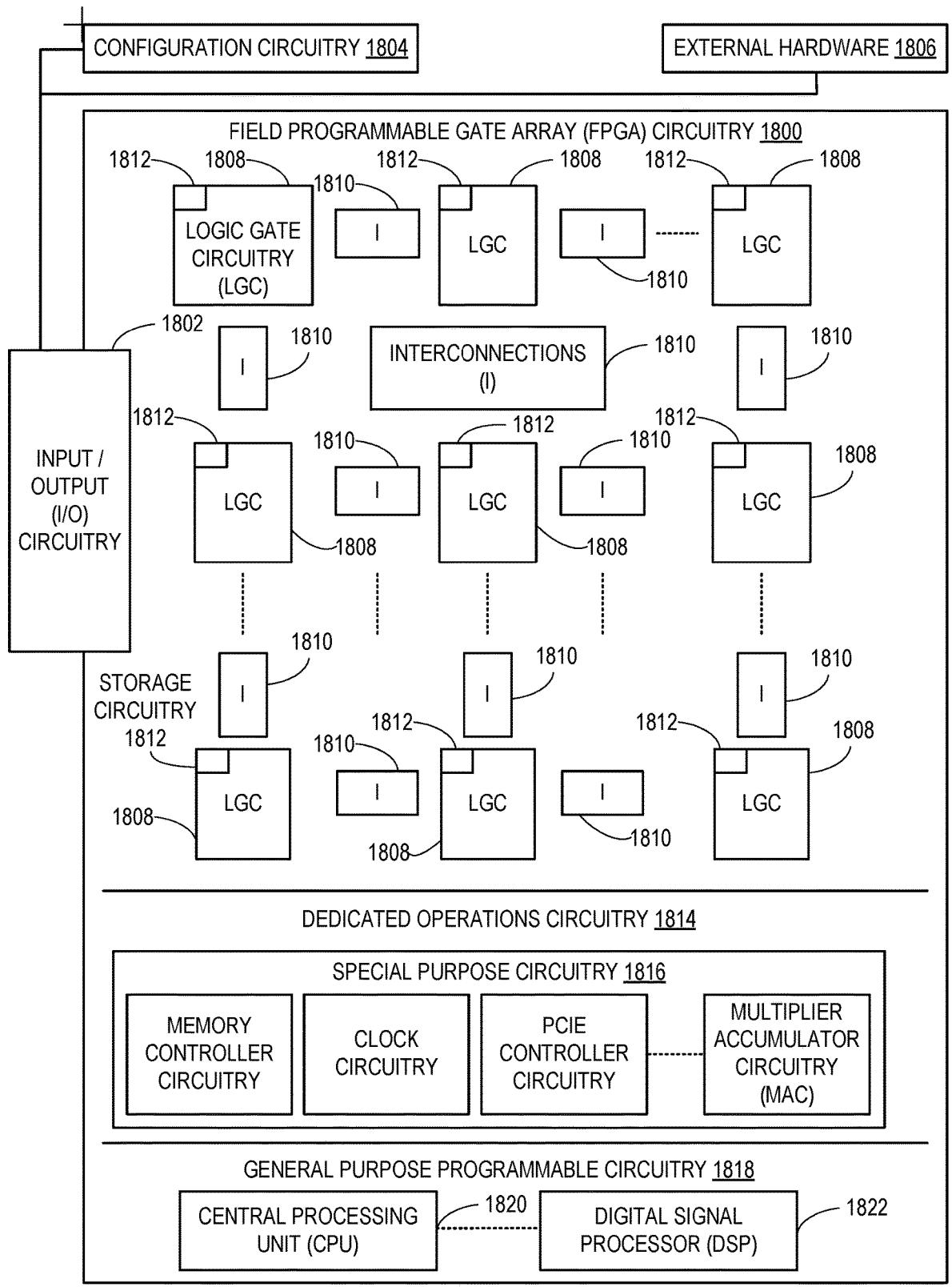
FIG. 18 is a block diagram of another example implementation of the processor circuitry of FIGS. 14-16.

FIG. 18 is a block diagram of another example implementation of the processor circuitry 1412, 1512 and/or 1612 of FIGS. 14-16. In this example, the processor circuitry 1412, 1512 and/or 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 7-13 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 7-13. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 7-13. As such, the FPGA circuitry 1800 may be structured to effectively instantiate some or all of the machine readable instructions of the flowcharts of FIGS. 7-13 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIG. faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 7-13 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1412, 1512 and/or 1612 of FIGS. 14-16, many other approaches are contemplated. For example, as mentioned above, modern FPGA circuitry may include an on-board CPU, such as one or more of the example CPU 1820 of FIG. 18. Therefore, the processor circuitry 1412, 1512 and/or 1612 of FIGS. 14-16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 7-13 may be executed by one or more of the cores 1702 of FIG. 17, a second portion of the machine readable instructions represented by the flowcharts of FIGS. 7-13 may be executed by the FPGA circuitry 1800 of FIG. 18, and/or a third portion of the machine readable instructions represented by the flowcharts of FIGS. 7-13 may be executed by an ASIC. It should be understood that some or all of the circuitry of FIGS. 4-6 may, thus, be instantiated at the same or different times. Some or all of the circuitry may be instantiated, for example, in one or more threads executing concurrently and/or in series. Moreover, in some examples, some or all of the circuitry of FIGS. 4-6 may be implemented within one or more virtual machines and/or containers executing on the microprocessor.

In some examples, the processor circuitry 1412, 1512 and/or 1612 of FIGS. 14-16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1412, 1512 and/or 1612 of FIGS. 14-16, which may be in one or more packages. For example, the XPU may include a CPU in one package, a DSP in another package, a GPU in yet another package, and an FPGA in still yet another package.

The user data attribute-based data protection protocol disclosed herein can be used by a data operator that wishes to offer data-based services to guests/customers on a premise of the data operator. The disclosed protocols allow the data operator to assure such guests/customers that any user data they choose to share from their user devices while on the premises of the data operator will be protected based on attributes specified by the user. The user attributes, which can include geographical location and a timeframe, must be satisfied by a data compute agent contracted to process the user data. Further, the data compute agents cannot fake compliance with the user attributes by sending falsified agent attributes to the data operator for verification because the data compute agents are verified to use tamper-proof hardware to generate a location attribute and a time-based agent attribute. Providing users with this level of data security makes the user more likely to share their data which the data operator can then process or have processed in a manner that improves the guests/customers experiences at the premises of the data operator. Additionally, data compute agents that process the user data on behalf of the data operator can be assured that user data received from a data operator is not corrupt or infected with viruses or malware as the protocol ensures that the user data is from a user device 102 having tamper-proof hardware and not from a spoofed account. As such, the protocol disclosed herein enhances the capabilities of the user device by encouraging user to tap into data processing services offered by the data operator. Additionally the protocol disclosed herein protects not only the security of the user data but also the equipment of the data compute agents and the data operator from effects of malicious data. Thus the protocol disclosed herein improves the processing of the processing equipment/componentry/circuitry disclosed herein, including the processing equipment/componentry/circuitry of the user devices, the data operators and the data compute agents that use the protocol.

Example methods, apparatus, systems, and articles of manufacture to control access to user data based on user-specified attributes are disclosed herein. Further examples and combinations thereof include the following:

Example 1 includes an apparatus to protect user data, the apparatus comprising memory, instructions, and at least one processor to execute the instructions to attempt to verify an identity bid, the identity bid associated with a request for access to user data to be processed, and the identity bid to include a cryptographic signature based on a secret embedded in a data compute agent that generated the identity bid, determine whether agent attributes included in the identity bid satisfy user data attributes associated with the user data, and permit the data compute agent to access the user data when the identity bid is verified, and when the agent attributes satisfy the user data attributes.

Example 2 includes the apparatus of example 1, wherein to attempt to verify the identity bid, the processor is to attempt to verify the cryptographic signature.

Example 3 includes the apparatus of example 2, wherein a successful attempt to verify the cryptographic signature indicates the identity bid was generated on tamper-proof hardware.

Example 4 includes the apparatus of example 1, wherein the agent attributes include at least a first agent attribute identifying a geographic location at which the data compute agent is located, the user data attributes include at least a first agent attribute specifying a geographic region in which the user data is to be processed, and the processor is to determine whether the first agent attribute satisfies the first user data attribute by determining whether the geographic location lies within a geographic region specified by the user data attribute.

Example 5 includes the apparatus of example 1, wherein the agent attributes include at least a first agent attribute identifying a data processing turnaround time, the user data attributes include at least a first user data attribute specifying a data processing end time, and the processor is to determine whether the first agent attribute satisfies the first user data attribute by determining, based on the data processing turnaround time and a current time, whether the data compute agent will be able to finish processing the user data before the data processing end time.

Example 6 includes At least one non-transitory computer readable medium comprising computer readable instructions that, when executed, cause at least one processor to at least attempt to verify an identity bid, the identity bid associated with a request for access to user data to be processed, and the identity bid to include a cryptographic signature based on a secret embedded in a data compute agent that generated the identity bid, determine whether agent attributes included in the identity bid satisfy user data attributes associated with the user data, and permit the data compute agent to access the user data when the identity bid is verified, and when the agent attributes satisfy the user data attributes.

Example 7 includes the at least one non-transitory computer readable medium of example 6, wherein to attempt to verify the identity bid, the instructions, when executed, cause the processor to attempt to verify the cryptographic signature.

Example 8 includes the at least one non-transitory computer readable medium of example 7, wherein a successful attempt to verify the cryptographic signature indicates the identity bid was generated on hardware that is tamper proof.

Example 9 includes the at least one non-transitory computer readable medium of example 6, wherein the agent attributes include at least a first agent attribute identifying a geographic location at which the data compute agent is located, the user data attributes include at least a first agent attribute specifying a geographic region in which the user data is to be processed, and the instructions, when executed, cause the processor to determine whether the first agent attribute satisfies the first user data attribute by determining whether the geographic location lies within a geographic region specified by the user data attribute.

Example 10 includes the at least one non-transitory computer readable medium of example 6, wherein the agent attributes include at least a first agent attribute identifying a data processing turnaround time, the user data attributes include at least a first user data attribute specifying a data processing end time, and the instructions, when executed, cause the processor to determine whether the first agent attribute satisfies the first user data attribute by determining, based on the data processing turnaround time and a current time, whether the data compute agent will be able to finish processing the user data before the data processing end time.

Example 11 includes the at least one non-transitory computer readable medium of example 6, wherein the instructions, when executed, cause the processor to encrypt the user data and the user data attributes based on at least one key, and cause the encrypted user data and the encrypted user data attributes to be transmitted to the data compute agent, the encrypted user data and the encrypted user data attributes transmitted before a time at which the identity bid is received, and the identity bid responsive to receipt of the encrypted user data and the encrypted user data attributes.

Example 12 includes the at least one non-transitory computer readable medium of example 6, wherein to permit the data compute agent to access the user data, the instructions, when executed, cause the processor to transmit a key to the data compute agent, the key to be used to decrypt the encrypted user data.

Example 13 includes the at least one non-transitory computer readable medium of example 6, wherein the user data is obtained from a user device and includes a proof of authenticity token generated by the user device, the proof of authenticity token to prove that the user device includes trusted silicon.

Example 14 includes a method to protect user data, the method comprising attempting to verify an identity bid, the identity bid associated with a request for access to user data to be processed, and the identity bid to include a cryptographic signature based on a secret embedded in a data compute agent that generated the identity bid, determining whether agent attributes included in the identity bid satisfy user data attributes associated with the user data, and permitting the data compute agent to access the user data when the identity bid is verified, and when the agent attributes satisfy the user data attributes.

Example 15 includes the method of example 14, wherein the attempting to verify the identity bid includes attempting to verify the cryptographic signature.

Example 16 includes the method of example 15, wherein a successful attempt to verify the cryptographic signature indicates the identity bid was generated on tamper-proof hardware.

Example 17 includes the method of example 14, wherein the agent attributes include at least a first agent attribute identifying a geographic location at which the data compute agent is located, the user data attributes include at least a first agent attribute specifying a geographic region in which the user data is to be processed, and the determining of whether the agent attributes satisfy the user data attributes includes determining whether the geographic location lies within the geographic region.

Example 18 includes the method of example 14, wherein the agent attributes include at least a first agent attribute identifying a data processing turnaround time, the user data attributes include at least a first user data attribute specifying a data processing end time, and the determining of whether the agent attributes satisfy the user data attributes includes determining, based on the data processing turnaround time and a current time, whether the data compute agent can process the user data before the data processing end time.

Example 19 includes the method of example 14, the method further including encrypting the user data and the user data attributes based on at least one key, and causing the encrypted user data and the encrypted user data attributes to be transmitted to the data compute agent, the encrypted user data and the encrypted user data attributes transmitted before a time at which the identity bid is received, and the identity bid responsive to receipt of the encrypted user data and the encrypted user data attributes.

Example 20 includes the method of example 14, wherein the permitting of the data compute agent to access the user data includes causing a key to be transmitted to the data compute agent, the key to be used to decrypt the encrypted user data.

Example 21 includes an apparatus to control access to user data comprising memory, instructions, and at least one processor to execute the instructions to permit a data compute agent to access first user data when a first response bid is received from the data compute agent, the first response bid to indicate the data compute agent will process the user data in accordance with first user data attributes associated with the first user data, generate an audit bid, the audit bit to include second user data attributes, one or more of the second user data attributes in conflict with one or more of the first user data attributes, and adjust a trusted agent ranking of the data compute agent based on a second response bid, the second response bid responsive to the audit bid and the second response bid received from the data compute agent.

Example 22 includes the apparatus of example 21, wherein the first user data attributes include a first location attribute, the second user data attributes include a second location attribute, the first location attribute and the second location attribute corresponding to non-overlapping locations, and the processor is to decrease the trusted agent ranking when the second response bid to the audit bid indicates the data compute agent is capable of operating on the second user data in compliance with the second user data attributes.

Example 23 includes the apparatus of example 21, wherein the first user data attributes and the second user data attributes include a same expiration time attribute, the audit bid is transmitted to the data compute agent after the expiration time attribute, and the processor is to decrease the trusted agent ranking when the second response bid indicates the data compute agent is capable of operating on the second user data in compliance with the expiration time attribute.

Example 24 includes the apparatus of example 21, wherein the first user data is encrypted, and the processor is to permit the data compute agent to access the first user data by causing, in response to the first bid, a key to be transmitted to the data compute agent for use in decrypting the first user data.

Example 25 includes the apparatus of example 21, wherein the first user data and the first user data attributes are secured with first and second encryption locks, respectively, and the processor causes the first user data and the first user data attributes to be transmitted to the data compute agent.

Example 26 includes At least one non-transitory computer readable medium comprising computer readable instructions that, when executed, cause at least one processor to at least permit a data compute agent to access first user data when a first response bid is received from the data compute agent, the first response bid to indicate the data compute agent will process the user data in accordance with first user data attributes associated with the first user data, generate an audit bid, the audit bit to include second user data attributes, one or more of the second user data attributes in conflict with one or more of the first user data attributes, and adjust a trusted agent ranking of the data compute agent based on a second response bid from the data compute agent, the second response bid responsive to the audit bid.

Example 27 includes the at least one non-transitory computer readable medium of example 26, wherein the first user data attributes include a first location attribute, the second user data attributes include a second location attribute, the first location attribute and the second location attribute corresponding to non-overlapping locations, and the instructions, when executed, cause the at least one processor to adjust the trusted agent ranking to indicate the data compute agent is less trustworthy when the second response bid to the audit bid indicates the data compute agent is capable of operating on the second user data in compliance with the second user data attributes.

Example 28 includes the at least one non-transitory computer readable medium of example 26, wherein the first user data attributes and the second user data attributes include a same expiration time attribute, the audit bid is transmitted to the data compute agent after the expiration time attribute, and the instructions, when executed, cause the at least one processor to adjust the trusted agent ranking to indicate the data compute agent is less trustworthy when the second response bid indicates the data compute agent is capable of operating on the second user data in compliance with the expiration time attribute.

Example 29 includes the at least one non-transitory computer readable medium of example 26, wherein the first user data is encrypted, and the processor is to permit the data compute agent to access the first user data by causing a key to be transmitted to the data compute agent for use in decrypting the first user data in response to the first response bid.

Example 30 includes a method to control access to user data, the method comprising permitting a data compute agent to access first user data when a first bid response is received from the data compute agent, the first bid response to indicate the data compute agent will process the first user data in accordance with first user data attributes associated with the first user data, generating an audit message to include in a bid request to send to the data compute agent, the audit message to include second user data attributes and second user data, and the second user data attributes including one or more second user data attributes that conflict with the first user data attributes, and adjusting a trusted agent ranking of the data compute agent based on a response to the audit message, the response received from the data compute agent.

Example 31 includes the method of example 30, wherein the first user data attributes include a first location attribute, the second user data attributes include a second location attribute, the first location attribute and the second location attribute correspond to non-overlapping locations, and the adjusting of the trusted agent ranking causes the trusted agent ranking to be lowered when the second response bid to the audit bid indicates the data compute agent is capable of operating on the second user data in compliance with the second user data attributes.

Example 32 includes the method of example 30, wherein the first user data attributes and the second user data attributes include a same expiration time attribute, the audit bid is transmitted to the data compute agent after the expiration time attribute and adjusting of the trusted agent ranking causes the trusted agent ranking to be lowered when the second response bid indicates the data compute agent is capable of operating on the second user data in compliance with the expiration time attribute.

Example 33 includes the method of example 30, wherein the first user data is encrypted, and the permitting of the data compute agent to access the first user data including causing a key to be transmitted to the data compute agent for use in decrypting the first user data in response to the first response bid.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
processing circuitry coupled to a memory, the processing circuitry to:
verify an identity bid, the identity bid associated with a request for access to user data, wherein the identity bid includes a cryptographic signature based on a secret embedded in a data compute agent having agent attributes, wherein the identity bit to identify user attributes; and
permit access to the user data when the identity bid is verified such that when the user attributes match the agent attributes.

2. The apparatus of claim 1, wherein to verify the identity bid includes to verify the cryptographic signature indicating the identity bid was generated on tamper-proof hardware.

3. The apparatus of claim 1, wherein the agent attributes comprise a first agent attribute identifying a geographic location at which the data compute agent is located, wherein the user attributes comprise a first agent attribute specifying a geographic region where the user data is to be processed, and wherein the user attributes match the agent attributes when the geographic location lies within the geographic region.

4. The apparatus of claim 1, wherein the agent attributes comprise a first agent attribute identifying a data processing turnaround time, wherein the user attributes comprises a first user data attribute specifying a data processing end time, and wherein the user attributes match the agent attributes when the data processing turnaround time is scheduled to end prior to the data processing end time, wherein the processing circuitry comprises one or more of application processing circuitry or graphics processing circuitry.

5. The apparatus of claim 1, wherein verifying the identity bid includes verifying the cryptographic signature indicating the identity bid was generated on tamper-proof hardware.

6. A method comprising:
verifying, by processing circuitry of a computing device, an identity bid, the identity bid associated with a request for access to user data, wherein the identity bid includes a cryptographic signature based on a secret embedded in a data compute agent having agent attributes, wherein the identity bit to identify user attributes; and permitting access to the user data when the identity bid is verified such that when the user attributes match the agent attributes.

7. The method of claim 6, wherein the agent attributes comprise a first agent attribute identifying a geographic location at which the data compute agent is located, wherein the user attributes comprise a first agent attribute specifying a geographic region where the user data is to be processed, and wherein the user attributes match the agent attributes when the geographic location lies within the geographic region.

8. The method of claim 6, wherein the agent attributes comprise a first agent attribute identifying a data processing turnaround time, wherein the user attributes comprises a first user data attribute specifying a data processing end time, and wherein the user attributes match the agent attributes when the data processing turnaround time is scheduled to end prior to the data processing end time.

9. The method of claim 6, wherein the processing circuitry is coupled to a memory, the processing circuitry comprises one or more of application processing circuitry or graphics processing circuitry.

10. At least one computer-readable medium having stored thereon instructions which, when executed, cause a computing device to perform operations comprising:
    verifying an identity bid, the identity bid associated with a request for access to user data, wherein the identity bid includes a cryptographic signature based on a secret embedded in a data compute agent having agent attributes, wherein the identity bit to identify user attributes; and
    permitting access to the user data when the identity bid is verified such that when the user attributes match the agent attributes.

11. The computer-readable medium of claim 10, wherein verifying the identity bid includes verifying the cryptographic signature indicating the identity bid was generated on tamper-proof hardware.

12. The computer-readable medium of claim 10, wherein the agent attributes comprise a first agent attribute identifying a geographic location at which the data compute agent is located, wherein the user attributes comprise a first agent attribute specifying a geographic region where the user data is to be processed, and wherein the user attributes match the agent attributes when the geographic location lies within the geographic region.

13. The computer-readable medium of claim 10, wherein the agent attributes comprise a first agent attribute identifying a data processing turnaround time, wherein the user attributes comprises a first user data attribute specifying a data processing end time, and wherein the user attributes match the agent attributes when the data processing turnaround time is scheduled to end prior to the data processing end time.

14. The computer-readable medium of claim 10, wherein the computing device comprises processing circuitry coupled to a memory, the processing circuitry having one or more of application processing circuitry or graphics processing circuitry.

* * * * *